(«12») United States Patent
Kim et al.

(10) Patent No.: US 12,247,347 B2
(45) Date of Patent: Mar. 11, 2025

(54) GARMENT FOLDING APPARATUS

(71) Applicant: LG Electronics Inc., Seoul (KR)

(72) Inventors: Keunjoo Kim, Seoul (KR); Jeongyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 17/784,493

(22) PCT Filed: Dec. 8, 2020

(86) PCT No.: PCT/KR2020/017811
§ 371 (c)(1),
(2) Date: Jun. 10, 2022

(87) PCT Pub. No.: WO2021/118194
PCT Pub. Date: Jun. 17, 2021

(65) Prior Publication Data
US 2023/0034688 A1    Feb. 2, 2023

(30) Foreign Application Priority Data

Dec. 11, 2019   (KR) ........................ 10-2019-0164579
Dec. 11, 2019   (KR) ........................ 10-2019-0164589

(51) Int. Cl.
*D06F 89/02*    (2006.01)
*B65G 15/22*    (2006.01)
*D06F 89/00*    (2006.01)
(52) U.S. Cl.
CPC ............. *D06F 89/02* (2013.01); *B65G 15/22* (2013.01); *D06F 89/00* (2013.01); *B65G 2201/0229* (2013.01)
(58) Field of Classification Search
CPC .. A41H 43/025; A41H 43/0257; B65H 15/22; B65H 2201/0229; D06F 89/00; D06F 89/02; D06F 89/023
See application file for complete search history.

(56) References Cited

U.S. PATENT DOCUMENTS

| | | | | |
|---|---|---|---|---|
| 3,774,903 A | * | 11/1973 | Sjoman ................... | B65B 25/20 493/428 |
| 4,338,088 A | * | 7/1982 | Buss ....................... | B65H 45/04 414/794 |

(Continued)

FOREIGN PATENT DOCUMENTS

| | | |
|---|---|---|
| CN | 103979361 | 8/2014 |
| CN | 109878793 | 6/2019 |

(Continued)

OTHER PUBLICATIONS

Extended European Search Report in European Appln. No. 20898835.2, mailed on Nov. 13, 2023, 4 pages.

(Continued)

*Primary Examiner* — F Griffin Hall
(74) *Attorney, Agent, or Firm* — Fish & Richardson P.C.

(57) ABSTRACT

A garment folding apparatus serves to fold a garment while conveying the garment. The garment folding apparatus includes a loading assembly configured to load a garment, a folding assembly configured to fold the loaded garment while conveying the garment, and an unloading assembly disposed below the folding assembly and configured to unload a completely folded garment. The folding assembly includes a first conveyor configured to convey the garment in a horizontal direction, a second conveyor disposed to be spaced apart from the first conveyor in the horizontal direction, and a horizontal folding assembly including a folding bar configured to be inserted into a separation space between the first conveyor and the second conveyor, where an inclined surface of the first conveyor and an inclined surface of the second conveyor face each other, such that various horizontal folding processes are performed within a limited space.

11 Claims, 18 Drawing Sheets

(56) References Cited

U.S. PATENT DOCUMENTS

| | | | | | |
|---|---|---|---|---|---|
| 4,548,595 | A | * | 10/1985 | Heater | B65H 45/04 493/458 |
| 5,540,647 | A | * | 7/1996 | Weiermann | D06F 89/00 493/938 |
| 5,996,861 | A | * | 12/1999 | Propach | B65B 63/04 223/37 |
| 6,915,929 | B2 | * | 7/2005 | Rauch | D06F 89/00 223/37 |
| 7,617,656 | B2 | * | 11/2009 | Wiedmann | B65H 45/18 53/53 |
| 9,724,246 | B2 | * | 8/2017 | Wada | B65H 29/242 |
| 2019/0292718 | A1 | * | 9/2019 | Maeshima | D06F 89/00 |

FOREIGN PATENT DOCUMENTS

| | | | | |
|---|---|---|---|---|
| CN | 209159047 | | 7/2019 | |
| EP | 0612879 | | 8/1994 | |
| GB | 1208728 | | 10/1970 | |
| JP | 07010370 | | 1/1995 | |
| JP | 3073729 | | 8/2000 | |
| JP | 2008-018100 | A | 1/2008 | |
| KR | 200309150 | | 3/2003 | |
| WO | WO-2012020135 | A1 * | 2/2012 | B65H 45/04 |

OTHER PUBLICATIONS

International Search Report in International Appln. No. PCT/KR2020/017811, dated Mar. 16, 2021, 5 pages (with English translation).
Extended European Search Report in European Appln. No. 20898835.2, mailed on Mar. 28, 2024, 17 pages.
Office Action in Korean Appln. No. 10-2019-0164589, mailed on Nov. 18, 2024, 12 pages (with English translation).

* cited by examiner

GARMENT FOLDING APPARATUS

CROSS-REFERENCE TO RELATED APPLICATIONS

This application is a National Stage application under 35 U.S.C. § 371 of International Application No. PCT/KR2020/017811, filed on Dec. 8, 2020, which claims the benefit of Korean Application Nos. 10-2019-0164579, filed on Dec. 11, 2019, and 10-2019-0164589, filed on Dec. 11, 2019. The disclosures of the prior applications are incorporated by reference in their entirety.

TECHNICAL FIELD

The present disclosure relates to an automated apparatus for folding a garment.

BACKGROUND ART

Garments are made of soft materials such as natural fibers or synthetic fibers and need to be folded to appropriate sizes and shapes so that the garments are stored and carried.

Usually, it is necessary to perform a process of folding the garments significantly often or perform a process of folding a large quantity of garments in order to accommodate the garments after washing the garments or to store the garments for a long period of time in accordance with a change in season. However, a process of manually and directly folding the garments causes a waste of time and resources. In a case in which the garments are folded by unskilled persons, the shapes and the sizes of the folded garments are not uniform, which causes a problem in that additional labor is required to fold the garments for the purpose of displaying or storing the garments.

Therefore, there is a gradually increasing need for an automated apparatus (hereinafter, referred to as a 'garment folding apparatus') capable of quickly and uniformly performing a process of folding garments. PCT International Patent Application Laid-Open No. 2018-122841 (entitled DOMESTIC COMPACT ARTICLE FOLDING MACHINE HAVING STACKED CONVEYOR LAYERS AND FOLDING METHOD THEREFOR) (hereinafter, referred to as the 'related art document') has been published on Jul. 5, 2018, in respect to the garment folding apparatus in the related art. The related art document discloses a technology related to an automated apparatus in which a garment is loaded into an upper side of the automated apparatus, folded, and unloaded from a lower side of the automated apparatus.

However, in the case of the apparatus disclosed in the related art document, one or more folding layers and one or more folding assemblies are required to fold a garment once during a folding process, which inevitably causes a problem of an increase in overall size of the apparatus. In particular, to continuously perform the horizontal folding process twice in the apparatus disclosed in the related art document, the folding layer and the conveyor for performing the horizontal folding process are disposed at the upper side, another folding layer and another conveyor are disposed below the above-mentioned configuration, and a folding layer and a conveyor for performing a subsequent horizontal folding process are disposed below the above-mentioned configuration. As described above, the three or more folding layers and the three or more conveyors are vertically disposed to perform only the two horizontal folding processes, which increases the size of the apparatus and causes various problems.

In addition, in the case of the apparatus disclosed in the related art document, there is a likelihood that the folding process is failed or incompletely performed because of a thickness or material of the garment or a frictional force. The horizontal folding layer disclosed in the related art document adopts a structure in which two stationary conveyors are disposed with a folding gap having a predetermined interval at a point at which the garment is intended to be folded. However, when a thick garment is loaded, the folding gap cannot accommodate the garment. For this reason, the folding process cannot be performed, and the garment is jammed in a severe case, which causes a malfunction of the apparatus. In addition, when a garment made of a material with a low frictional force, only the rotations of the two conveyors cannot accommodate the target garment in the folding gap, which causes a technical problem in that the folding process is failed or incompletely performed.

DISCLOSURE

Technical Problem

A first technical object of the present disclosure is to provide a garment folding apparatus capable of implementing at least two folding operations in a single folding layer space in order to solve a problem in the above-mentioned garment folding apparatus in which as a function of a size of the apparatus increases because of an increase in number of folding layers.

A second technical object of the present disclosure is to provide a garment folding apparatus capable of performing an accurate folding process on garments having various thicknesses and made of various materials without malfunction while solving the problems of the above-mentioned garment folding apparatus.

Technical Solution

One aspect of the present disclosure for achieving the first technical object provides a garment folding apparatus, which serves to fold a garment during a process of conveying the garment, the garment folding apparatus including: a loading assembly configured to load a garment; a folding assembly configured to fold the loaded garment while conveying the garment; and an unloading assembly disposed below the folding assembly and configured to unload a completely folded garment, in which the folding assembly includes: a first conveyor configured to convey the garment in a horizontal direction; a second conveyor disposed to be spaced apart from the first conveyor in the horizontal direction; and a horizontal folding assembly including a folding bar configured to be inserted into a separation space between the first conveyor and the second conveyor, and in which at least one conveyance surface of the first conveyor is inclined, and at least one conveyance surface of the second conveyor is inclined and disposed to face the inclined conveyance surface of the first conveyor.

In addition, according to the embodiment of the present disclosure for achieving the first technical object, the inclined conveyance surface of the first conveyor may maintain a predetermined interval from the inclined conveyance surface of the second conveyor.

In addition, according to the embodiment of the present disclosure for achieving the first technical object, the conveyance surface of the first conveyor may be inclined at 10 to 45 degrees with respect to a horizontal plane.

In addition, according to the embodiment of the present disclosure for achieving the first technical object, the conveyance surface of the first conveyor may be inclined at 30 to 35 degrees with respect to a horizontal plane.

According to another embodiment of the present disclosure for achieving the first technical object, the first conveyor may have a triangular shape, the second conveyor may have an inverted triangular shape, and the inclined surfaces of the first and second conveyors may be disposed to face each other.

According to another embodiment of the present disclosure for achieving the first technical object, the inclined surface of the first conveyor may maintain a predetermined interval from the inclined surface of the second conveyor.

In addition, according to the embodiment of the present disclosure for achieving the first technical object, the inclined surface of the first conveyor may be inclined at 10 to 45 degrees with respect to a horizontal plane.

In addition, according to the embodiment of the present disclosure for achieving the first technical object, the inclined surface of the first conveyor may be inclined at 30 to 35 degrees with respect to a horizontal plane.

In addition, according to the embodiment of the present disclosure for achieving the first technical object, the first conveyor may be an intermediate conveyor, the second conveyor may be a rear conveyor, and the folding assembly may further include: a front conveyor disposed to be spaced apart from the intermediate conveyor in the horizontal direction; a first horizontal folding assembly including a first folding bar configured to be inserted into a first folding gap which is a separation space between the front conveyor and the intermediate conveyor; and a second horizontal folding assembly including a second folding bar configured to be inserted into a second folding gap which is a separation space between the intermediate conveyor and the rear conveyor.

In addition, according to another embodiment of the present disclosure for achieving the first technical object, the first folding gap may have a predetermined interval so that the garment is withdrawn downward and folded.

In addition, according to another embodiment of the present disclosure for achieving the first technical object, the first folding gap may be positioned at a ½ point based on a longitudinal direction of the conveyors, and the second folding gap may be disposed rearward of the first folding gap and positioned at a ⅓ point based on the longitudinal direction of the conveyors.

In addition, according to another embodiment of the present disclosure for achieving the first technical object, the first folding bar and the second folding bar may operate independently.

In addition, according to another embodiment of the present disclosure for achieving the first technical object, the first horizontal folding assembly and the second horizontal folding assembly may share a support piece.

In addition, according to another embodiment of the present disclosure for achieving the first technical object, the first horizontal folding assembly and the second horizontal folding assembly respectively may have means for implementing upward and downward movements of the first folding bar and the second folding bar, and the means may be symmetrically disposed with respect to the support piece.

Another aspect of the present disclosure for achieving the first technical object provides a garment folding apparatus, which serves to fold a garment during a process of conveying the garment, the garment folding apparatus including: a loading assembly configured to load a garment; a folding assembly configured to fold the loaded garment while conveying the garment; and an unloading assembly disposed below the folding assembly and configured to unload a completely folded garment, in which the folding assembly includes a conveyor structure in which two or more conveyors are disposed in a horizontal direction, and in which the conveyor structure includes: a stationary conveyor; a sliding conveyor configured to operate to move away from the stationary conveyor in the horizontal direction; and a blade configured to operate to be inserted into a separation space between the sliding conveyor and the stationary conveyor.

In addition, according to the embodiment of the present disclosure for achieving the second technical object, the conveyor structure may be configured such that when the sliding conveyor moves to a maximum spacing distance in the horizontal direction, the blade operates in conjunction with the sliding conveyor and moves downward.

In addition, according to the embodiment of the present disclosure for achieving the second technical object, the conveyor structure may further include: a movable rail unit configured to move in the horizontal direction together with the sliding conveyor; a cam provided on the movable rail unit; and a hinge unit included in the blade and configured to be rotated by a movement of the cam.

In addition, according to the embodiment of the present disclosure for achieving the second technical object, one surface of the cam, which is in contact with the hinge unit, may be inclined so that the blade is rotated by the movable rail unit that moves in the horizontal direction.

In addition, according to the embodiment of the present disclosure for achieving the second technical object, the conveyor structure may further include a spring configured to provide an elastic force to move the sliding conveyor to an initial position.

Advantageous Effect

According to at least one of the embodiments for achieving the first technical object of the present disclosure, the structural configuration capable of performing the folding process at least twice in the operating space is provided, thereby contributing to the miniaturization of the apparatus.

According to at least one of the embodiments for achieving the first technical object of the present disclosure, the subsequent horizontal folding may smoothly be performed in the same folding layer after the primary horizontal folding is performed, the garment may be horizontally folded to a size and shape desired by the user in a limited horizontal space, and uniform and improved folding quality may be ensured.

According to at least one of the embodiments for achieving the second technical object of the present disclosure, even though the garments having various thicknesses and made of various materials are loaded, the conveyor structure capable of treating the garments may be provided, such that the garment may be accurately and perfectly folded at the intended point.

According to at least one of the embodiments for achieving the second technical object of the present disclosure, the folding gap may be sufficiently ensured and the blade may operate in conjunction with the folding gap, such that the horizontal folding process may be performed even on the thick garment or the garment made of a material with a low frictional force. Therefore, it is possible to ensure horizontal folding quality optimized for the respective garments.

An additional range of the applicability of the present disclosure will become apparent from the following detailed description. However, various alterations and modifications may be clearly understood by those skilled in the art without departing from the spirit and scope of the present disclosure. Accordingly, it should be understood that the detailed description and the specific embodiments such as the exemplary embodiments of the present disclosure are just provided for illustrative purposes.

MODE FOR INVENTION

Figure 1:
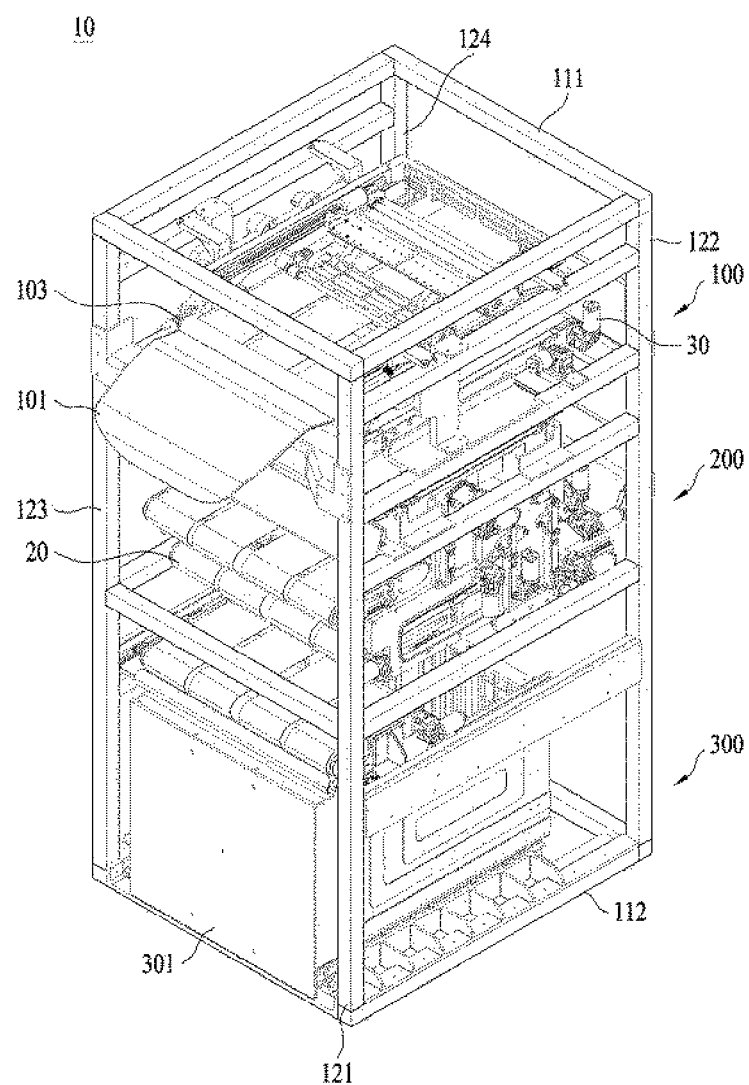
FIG. 1 is a perspective view of a garment folding apparatus according to an embodiment of the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted. The suffixes 'assembly', 'unit', 'part', and 'portion' used to describe constituent elements in the following description are used together or interchangeably in order to facilitate the description, but the suffixes themselves do not have distinguishable meanings or functions. In addition, in the description of the embodiment disclosed in the present specification, the specific descriptions of publicly known related technologies will be omitted when it is determined that the specific descriptions may obscure the subject matter of the embodiment disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as 'first', 'second', and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

Figure 2:
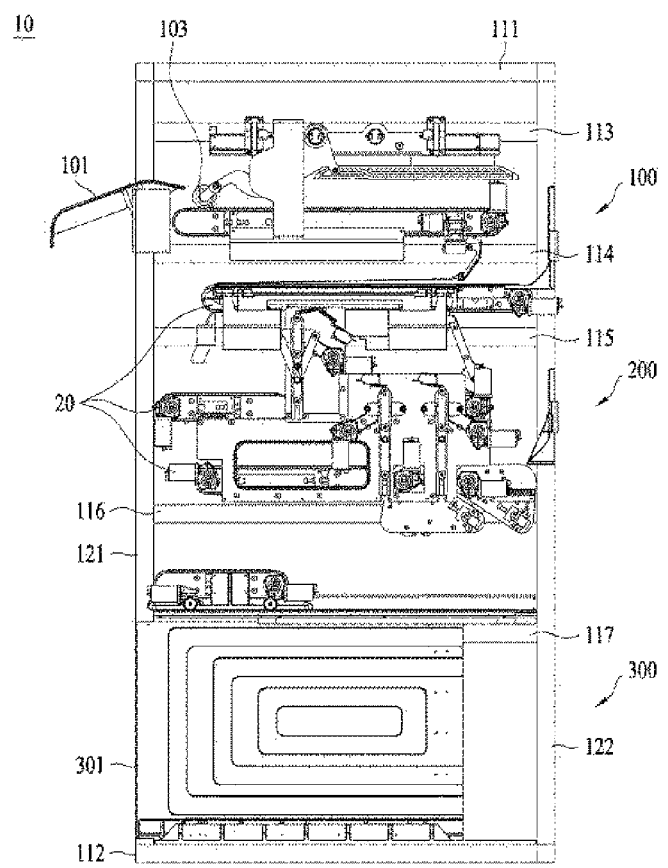
FIG. 2 is a side view of the garment folding apparatus in FIG. 1.
Figure 3:
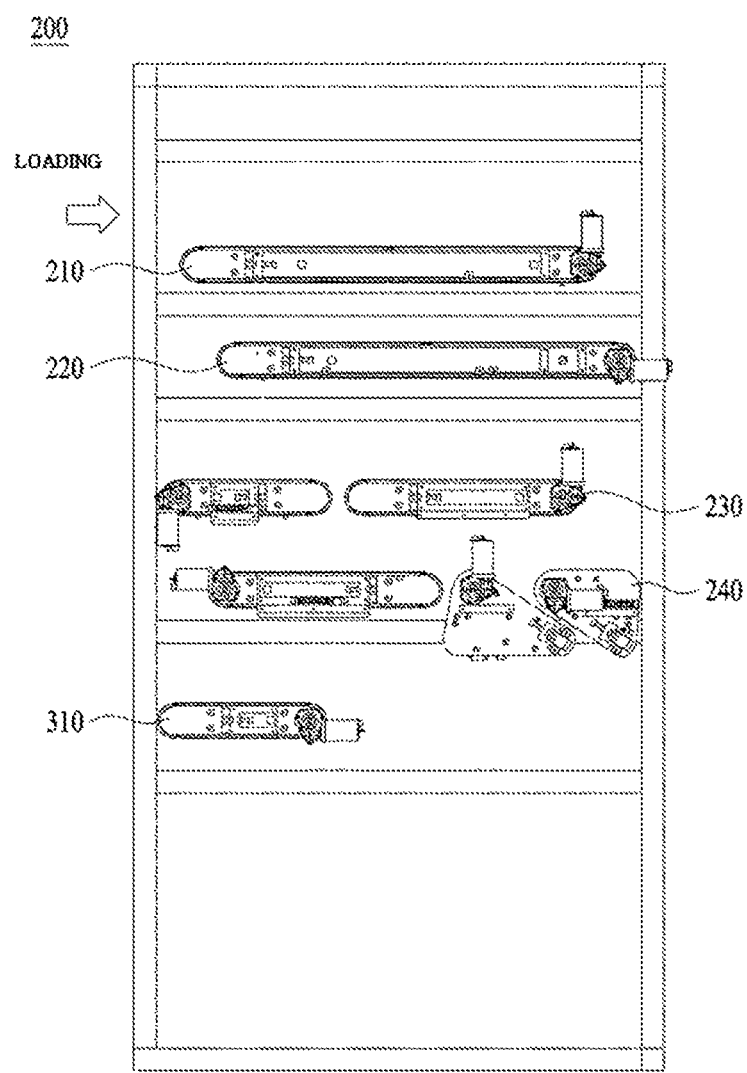
FIG. 3 is a side view illustrating a configuration of a folding assembly according to the embodiment of the present disclosure.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Hereinafter, a garment folding apparatus 10 according to the present disclosure will be described with reference to a description with reference to FIGS. 1 to 3. FIG. 1 is a perspective view of a garment folding apparatus according to an embodiment of the present disclosure, FIG. 2 is a side view of the garment folding apparatus in FIG. 1, and FIG. 3 is a side view illustrating a configuration of a folding assembly according to the embodiment of the present disclosure. Referring to FIGS. 1 and 2, the garment folding apparatus 10 according to the present disclosure may be supported and installed on a frame 110. The frame may serve as an external framework of the garment folding apparatus 10. The frame may be disposed on an outer edge of the garment folding apparatus 10 and define a minimum operating space for the garment folding apparatus 10. Several members constituting the garment folding apparatus 10 may be stably attached to and supported on the frame.

The frame includes an upper frame 111, a lower frame 112, and horizontal frames 113, 114, 115, 116, and 117. The frame includes vertical frames 121, 122, 123, and 124 (see FIG. 1) disposed vertically and configured to support the upper frame 111, the lower frame 112, and the horizontal frames.

A finishing cover (not illustrated) may be stably attached to an outer peripheral surface of the frame. The finishing cover may define an external appearance of the garment folding apparatus.

Since the frame is provided as described above, a vertical folding assembly to be described below may be stably supported and mounted to smoothly perform a garment folding function.

Referring to FIGS. 1 and 2, the garment folding apparatus 10 includes a loading assembly 100, a folding assembly 200, and an unloading assembly 300.

The loading assembly 100, the folding assembly 200, and the unloading assembly 300 may be supported on the frame. In addition, the loading assembly 100, the folding assembly 200, and the unloading assembly 300 may have operating spaces defined by the frame.

For example, an operating space of the loading assembly 100 may be defined by the upper frame 111 and the horizontal frame 114, and an operating space of the unloading assembly 300 may be defined by the horizontal frame 116 and the lower frame 112.

The loading assembly 100 is provided to load the garment. The loading assembly 100 may be provided such that the garment loaded onto the loading unit 101 may be placed on an upper surface of the conveyor 20. Specifically, the loading assembly 100 may be provided between the upper frame 111 and the horizontal frame 114 so that the garment loaded onto the loading unit 101 may be placed on the upper surface of the conveyor 20.

In this case, the garments not only mean upper garments or lower garments manufactured using natural fibers or synthetic fibers so as to be worn by persons, but also include all products such as towels or bedclothes that may be provided by being folded to have desired sizes and thicknesses by the garment folding apparatus.

In one embodiment, in the loading assembly 100, the garment loaded by the loading unit 101 is held by a clip unit 103 (see FIGS. 1 and 2). Thereafter, the clip unit 103 pulls the garment rearward by a predetermined distance and releases the garment so that the garment is placed on the upper surface of the conveyor 20. The conveyor 20 may be supported by the horizontal frame 114, and the clip unit 103 may be supported by the horizontal frame 113 horizontally disposed between the upper frame 111 and the horizontal frame 114.

The unloading assembly 300 serve to collect and unload the folded garments. The unloading assembly 300 may be configured such that the completely folded garments are conveyed from an unloading layer 310 (see FIG. 3) by the support conveyor and collected on an unloading unit 301. Specifically, the unloading assembly 300 may be provided between the horizontal frame 116 and the lower frame 112 so that the completely folded garments are conveyed by the support conveyor and collected on the unloading unit 301.

In one embodiment, the garment dropped by the folding assembly is placed on the support conveyor. Thereafter, the support conveyor moves in the forward/rearward direction, and at the same time, an unloading plate (not illustrated) moves in the upward/downward direction, such that the completely folded garments are uniformly collected in an internal space of the unloading unit 301. A guide rail configured to guide and support the movement of the support conveyor may be supported by the horizontal frame 117 horizontally disposed between the horizontal frame 116 and the lower frame 112. The vertical movement of the unloading plate of the vertical folding assembly may be supported by the lower frame 112.

The folding assembly 200 serve to convey and fold the loaded garment. The folding assembly 200 includes the two or more folding layers so that the loaded garment is folded to an appropriate size and shape. The two or more folding layers are disposed to be vertically spaced apart from each other. The loaded garment is folded one or more times in the respective folding layers while being conveyed from the folding layer at the upper side to the folding layer at the lower side, and the garments, which are completely folded to appropriate sizes and shapes, are collected in a discharge unit 301.

In the embodiment illustrated in FIG. 3, the folding assembly 200 may include four folding layers 210, 220, 230, and 240. The four folding layers 210, 220, 230, and 240 may be disposed to be vertically spaced apart from each other and serve to allow the loaded garment to be folded to an appropriate size and shape while being conveyed from the first folding layer 210 at the upper side to the fourth folding layer 240 at the lower side. The garment is folded one or more times in each of the folding layers. For example, the garment may be folded twice in the fourth folding layer 240.

The unloading layer 310 may be disposed below the lowermost folding layer. In the embodiment illustrated in FIG. 3, the unloading layer 310 may be further provided below the fourth folding layer 240, and the completely folded garment is dropped onto the unloading layer 310. As described above, the unloading layer 310 has the unloading unit 301 on which the completely folded garments are uniformly collected.

The folding layer includes the conveyor 20. The conveyor 20 serves to horizontally convey the loaded or dropped garment. The folding layers each have one or more conveyors 20. In a case in which the single folding layer has the two or more conveyors, a folding gap through which the garment is folded or passes while being folded is provided between the two conveyors.

In the embodiment illustrated in FIG. 3, the four folding layers 210, 220, 230, and 240 may each have one or more conveyors 20. The third folding layer 230 may have the two conveyors 20, and the fourth folding layer 240 may have the three conveyors 20. A folding gap through which the garment may pass while being folded may be formed between the two conveyors disposed in the third folding layer 230. Two folding gaps through which the garment may be folded or pass while being folded may be formed between the three conveyors provided in the fourth folding layer 240.

The support conveyor may be provided to be horizontally movable in the unloading layer 310. As described above, the support conveyor, together with the unloading plate (not illustrated), serves to uniformly collect the completely folded garments on the unloading unit 301.

Meanwhile, the folding assembly 200 may be configured such that the loaded garment is vertically folded while being conveyed, and the loaded or dropped garments is horizontally folded while being conveyed.

In the embodiment illustrated in FIG. 3, among the four folding layers constituting the folding assembly 200, the garment may be vertically folded in the two folding layers 210 and 220 (hereinafter, referred to as 'vertical folding layers') at the upper side, and the garment may be horizontally folded in the two folding layers 230 and 240 (hereinafter, referred to as 'horizontal folding layers') at the lower side.

In this case, the horizontal folding means that the garment is folded about a reference line perpendicular to a proceeding direction of the garment. The direction perpendicular to the proceeding direction of the garment is not limited to a configuration in which a line in the proceeding direction of the garment and a folding line are perfectly disposed at 90 degrees, but the direction perpendicular to the proceeding direction of the garment includes a configuration in which the line in the proceeding direction of the garment and the folding line are disposed within an error range of 0 degree to 30 degrees.

In this case, the vertical folding means that the garment is folded about a reference line parallel to the proceeding direction of the garment. The direction parallel to the proceeding direction of the garment is not limited to a configuration in which the line in the proceeding direction of the garment and the folding line are perfectly disposed at 0 degree, but the direction parallel to the proceeding direction of the garment includes a configuration in which the line in the proceeding direction of the garment and the folding line are disposed within an error range of 0 degree to 30 degrees.

Hereinafter, regarding the above-mentioned first technical object, the structures and functions of the horizontal folding layer and the horizontal folding assembly included in the horizontal folding layer will be described in detail.

Figure 4:
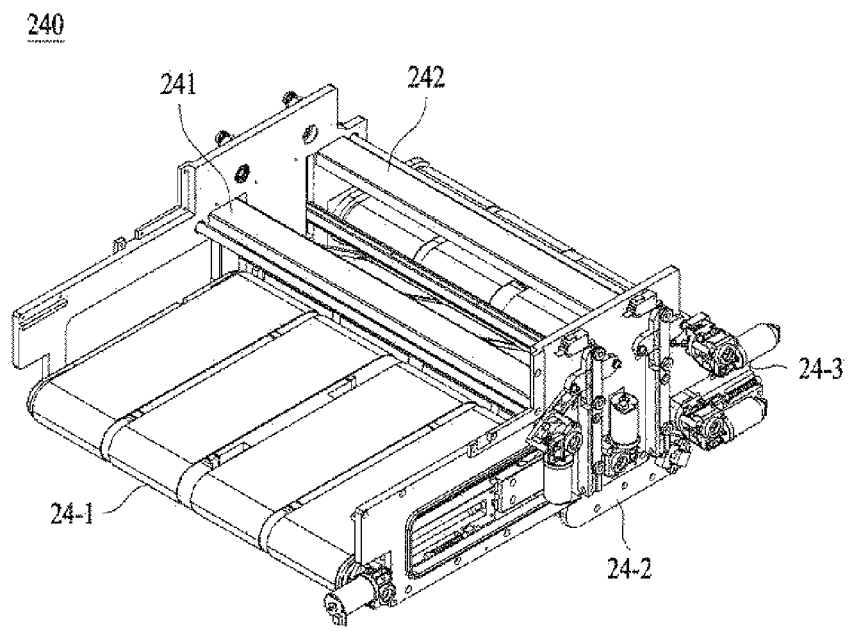
FIG. 4 is a perspective view illustrating a horizontal folding assembly related to a first technical object according to the embodiment of the present disclosure.
Figure 5:
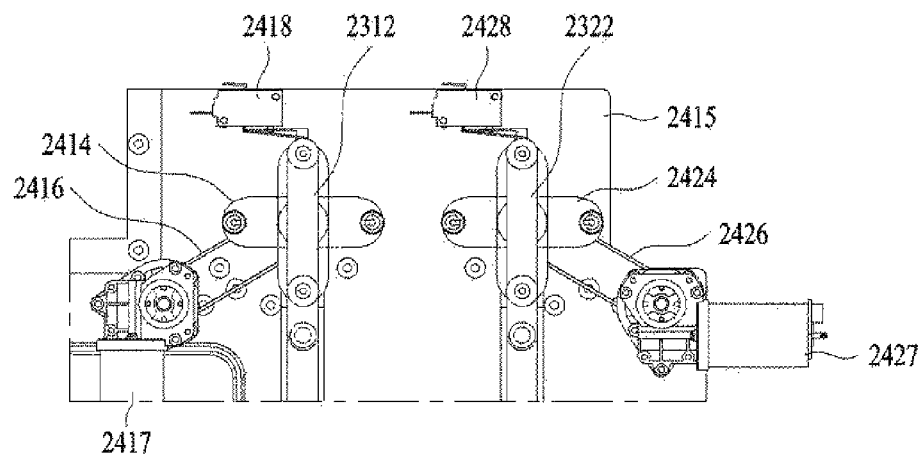
FIG. 5 is a detailed side view illustrating the horizontal folding assembly related to the first technical object according to the embodiment of the present disclosure.
Figure 6:
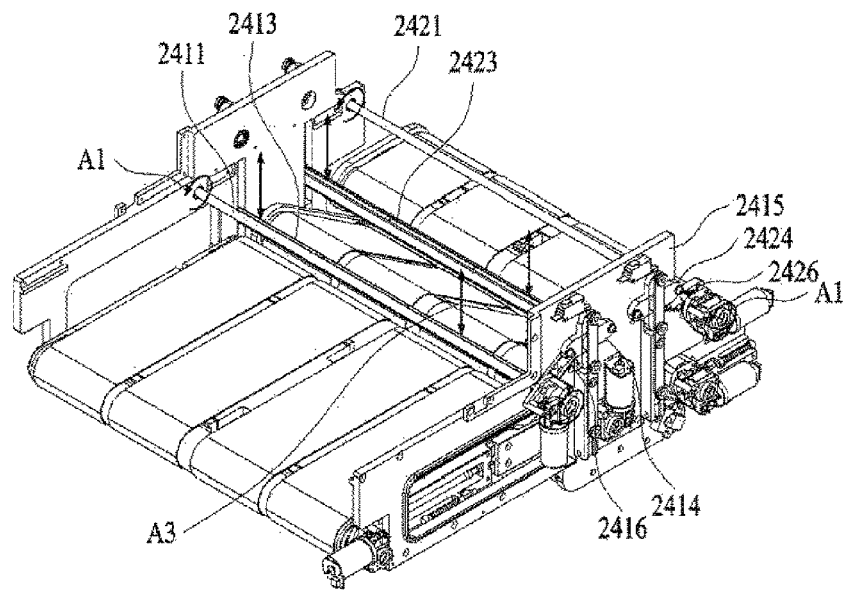
FIG. 6 is a view for explaining an operation of the horizontal folding assembly related to the first technical object according to the embodiment of the present disclosure.
Figure 7:
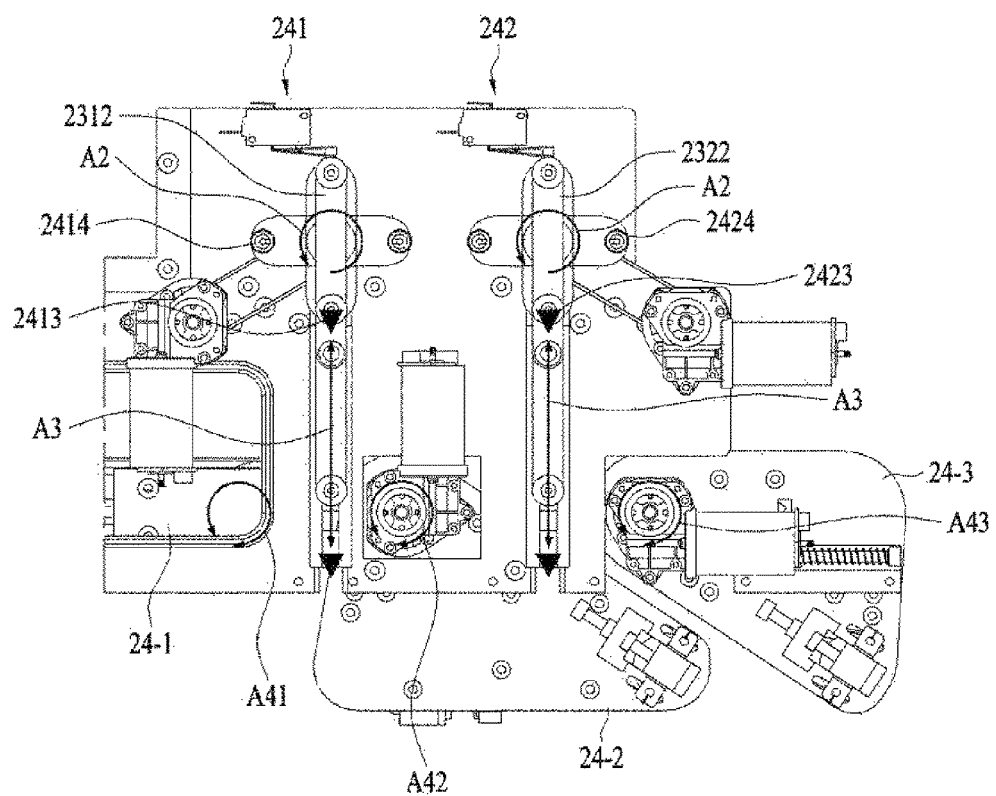
FIG. 7 is a detailed side view for explaining an operation of the horizontal folding assembly related to the first technical object according to the embodiment of the present disclosure.

FIG. 4 is a perspective view illustrating a horizontal folding assembly related to a first technical object according to the embodiment of the present disclosure, FIG. 5 is a detailed side view illustrating the horizontal folding assembly, FIG. 6 is a view for explaining an operation of the horizontal folding assembly, and FIG. 7 is a detailed side view for explaining an operation of the horizontal folding assembly.

Referring to the drawings, the folding assembly 200 includes the horizontal folding layer that serves to horizontally fold the loaded garment. The horizontal folding layers may include the third folding layer 230 and/or the fourth folding layer 240.

The horizontal folding layer includes the horizontal folding assembly. The horizontal folding assembly may be provided in the third folding layer 230 and/or the fourth folding layer 240.

Hereinafter, with reference to FIGS. 4 to 7, the embodiment will be described, in which the horizontal folding layers include the third folding layer 230 and the fourth folding layer 240, and the horizontal folding assembly is provided in the fourth folding layer 240.

The fourth folding layer 240 may be provided below the third folding layer 230. The fourth folding layer 240 may be configured to horizontally fold the garment loaded from the third folding layer 230 while conveying the garment.

The garment loaded from the loading assembly 100 may be subjected to the intended horizontal folding process while passing through the horizontal folding layer including the third folding layer 230 and the fourth folding layer 240. That is, the folding assembly 200 may have the horizontal folding layer that serves to horizontally fold the loaded garment to an intended size and shape.

In the embodiment illustrated in FIG. 4, the horizontal folding layer includes the horizontal folding assemblies 241 and 242. The horizontal folding assemblies 241 and 242 may include synchronizing bars 2411 and 2421, folding bars 2413 and 2423, support pieces 2415, and drive motors 2417 and 2427 so as to horizontally fold the garment C through folding gaps 243 and 244 (see FIG. 8) while withdrawing the garment C simultaneously.

Specifically, the horizontal folding layer may have the two folding gaps 243 and 244. The horizontal folding assemblies 241 and 242 may be provided to respectively correspond to the folding gaps so that the folding bars are independently controlled. That is, the folding bar and the assembly configured to move the folding bar upward or downward may be independently provided on the conveyor 24. To simplify the structure, the support pieces 2415 may be integrated and shared by the adjacent horizontal folding assemblies 241 and 242. Hereinafter, the first horizontal folding assembly 241 corresponding to the folding gap 243 between the front conveyor 24-1 and the intermediate conveyor 24-2 may be specifically described.

Referring to FIGS. 6 and 7, a rotational force A1 of the drive motor 2417 connected to a timing belt 2416 is transmitted to connecting rods 2414 supported on the support pieces 2415.

The support pieces 2415 may be provided at left and right sides of the conveyor 24. The synchronizing bar 2411 has left and right sides coupled to the connecting rods 2414 so that the operations of the connecting rods 2414 positioned at the left and right sides are synchronized. When the connecting rods 2414 rotate (A2), one end of a link bar 2412 connected to the connecting rod 2414 slides leftward and rightward, and the upward and downward movements (A3) of the folding bar 2413 connected to the other end of the link bar 2412 are implemented.

A micro-switch 2418 is provided adjacent to the connecting rod 2414 and detects a position of an upper end of the folding bar 2413, such that the on-off control of the drive motor 2417 may be implemented. A lever may be provided on the support piece 2315 to ensure a spacing distance of the micro-switch 2418.

In addition, the second horizontal folding assembly 242 corresponding to the folding gap 244 between the intermediate conveyor 24-2 and the rear conveyor 24-3 may be identical in structures and operation to the first horizontal folding assembly 241. That is, the second horizontal folding assembly 242 may independently include a synchronizing bar 2421, a link bar 2422, a folding bar 2423, connecting rods 2424, and a drive motor 2427 and operate independently of the operation of the first horizontal folding assembly 241.

Meanwhile, the support pieces 2415 may be shared by the two horizontal folding assemblies 241 and 242. In addition, the drive motors 2417 and 2427 and the connecting rods 2414 and 2424 are disposed symmetrically with respect to the support pieces 2415, such that the independent upward and downward motions of the two folding bars may be performed with the simple structure without mutual interference. Further, the drive motors 2417 and 2427 and the connecting rods 2414 and 2424 do not hinder the setting of a length of the intermediate conveyor 24-2, thereby improving a degree of design freedom.

As described above, the garment C may be horizontally folded by the horizontal folding assemblies 241 and 242 and the conveyors 24-1, 24-2, and 24-3. The garment C may be withdrawn downward through the folding gaps 243 and 244 by folding bars 2413 and 2423 of the horizontal folding assemblies 241 and 242. In this case, the front conveyor 24-1 and the intermediate conveyor 24-2 rotate in the opposite directions (A41 and A42) or the intermediate conveyor 24-2 and the rear conveyor 24-3 rotate in the opposite directions (A42 and A43), such that the garment C is folded at the folding gaps 243 and 244 or the garment C is pulled downward and dropped at the same time as the garment C is folded. The front conveyor 24-1 and the intermediate conveyor 24-2 may simultaneously rotate in the opposite directions, or the intermediate conveyor 24-2 and the rear conveyor 24-3 may simultaneously rotate in the opposite directions. The intermediate conveyor 24-2 and the rear conveyor 24-3 may rotate in the reverse direction to pull the garment upward.

Figure 8:
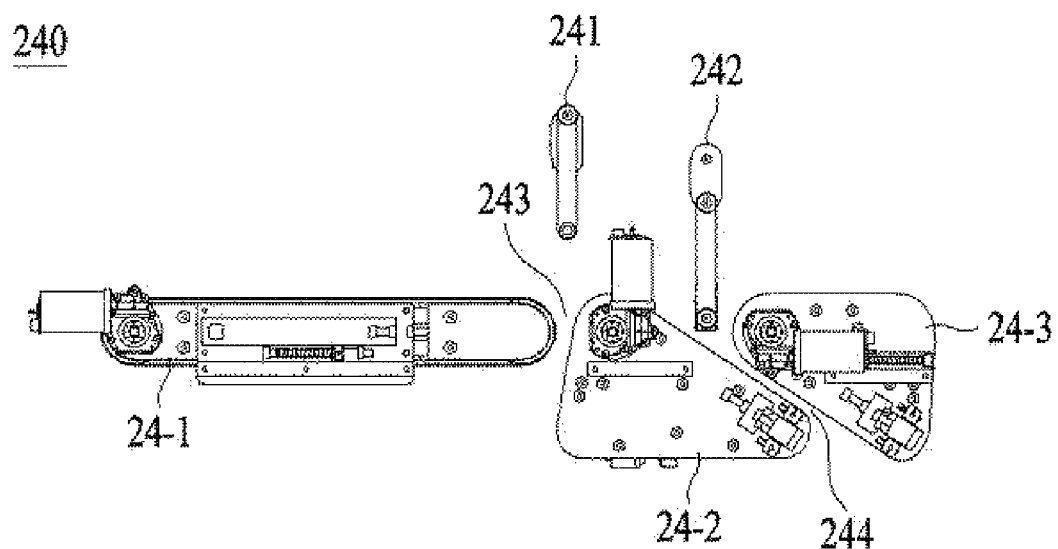
FIG. 8 is a side view briefly illustrating the horizontal folding assembly related to the first technical object according to the embodiment of the present disclosure.
Figure 9:
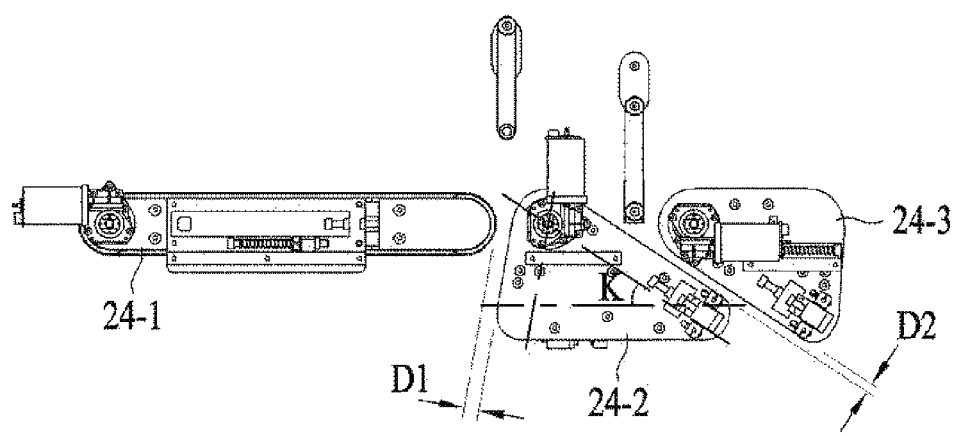
FIG. 9 is an explanatory view illustrating an interval and an angle between conveyors of the horizontal folding assembly in FIG. 8.
Figure 10:
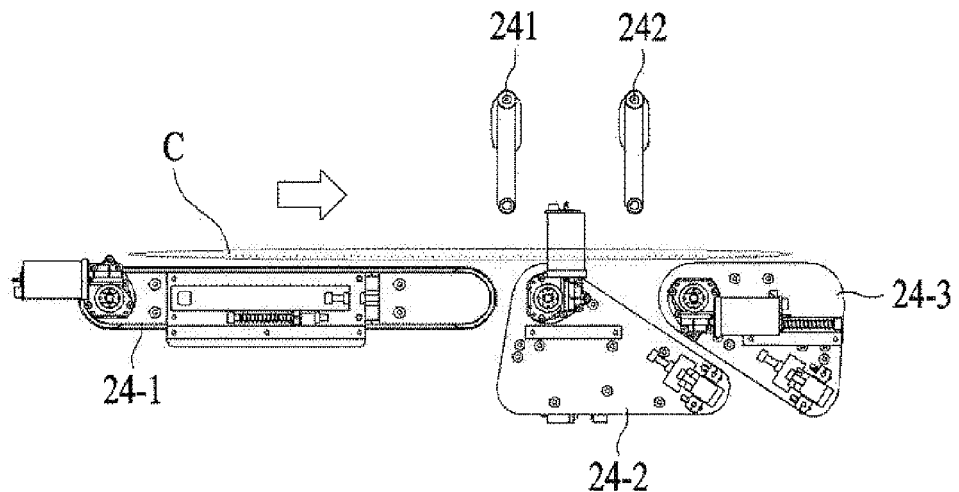
FIG. 10 is a view illustrating a state in which a garment is deployed on the horizontal folding assembly in FIG. 8.
Figure 11:
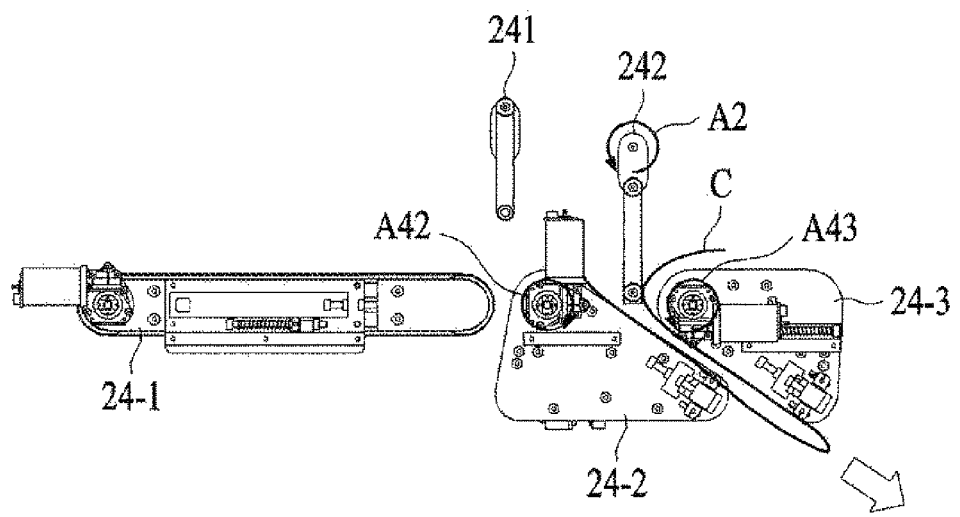
FIG. 11 is a view illustrating a state in which a garment in FIG. 10 is folded by a second horizontal folding assembly.
Figure 12:
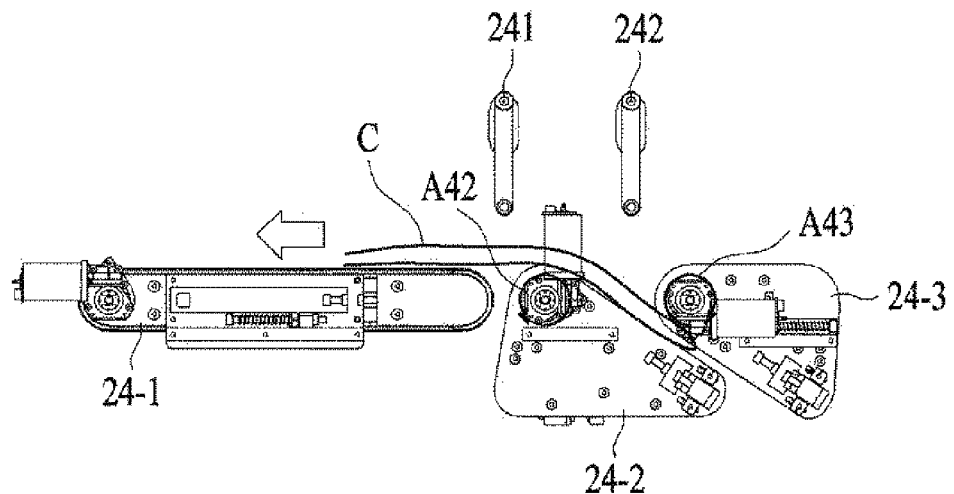
FIG. 12 is a view illustrating a state in which the garment in FIG. 11 is withdrawn upward after being folded by the second horizontal folding assembly.
Figure 13:
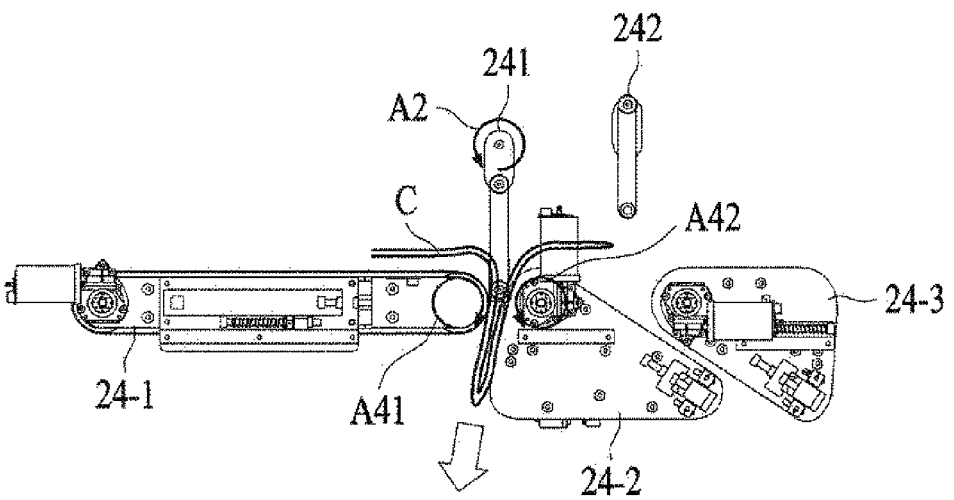
FIG. 13 is a view illustrating a state in which the garment in FIG. 12 is folded by a first horizontal folding assembly.
Figure 14:
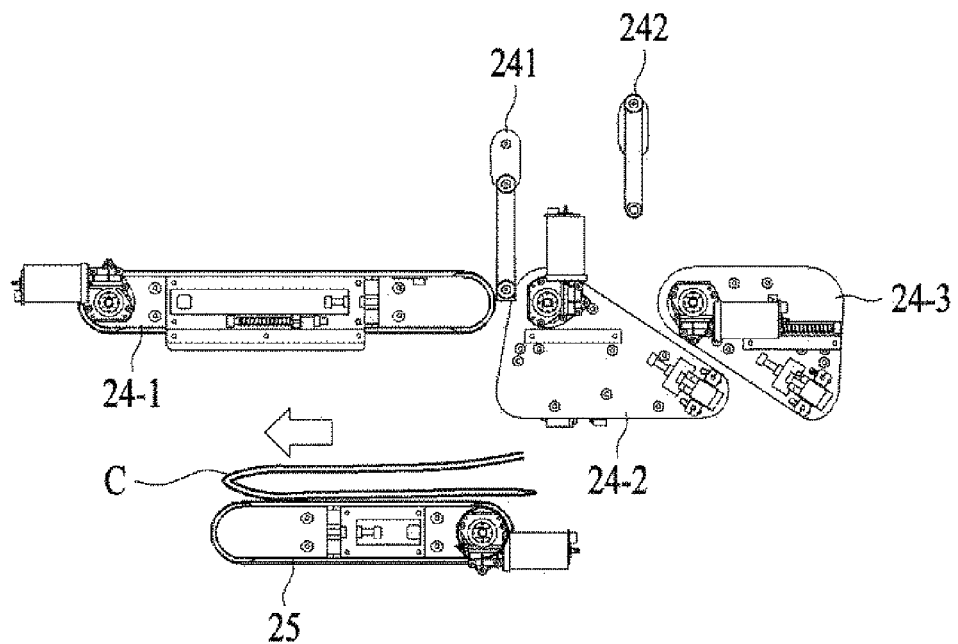
FIG. 14 is a view illustrating a state in which the garment in FIG. 13 is withdrawn downward after being folded by the first horizontal folding assembly.

FIG. 8 is a side view briefly illustrating the horizontal folding assembly related to the first technical object according to the embodiment of the present disclosure, FIG. 9 is an explanatory view illustrating an interval and an angle between conveyors of the horizontal folding assembly in FIG. 8, FIG. 10 is a view illustrating a state in which a garment is deployed on the horizontal folding assembly in FIG. 8, FIG. 11 is a view illustrating a state in which a garment in FIG. 10 is folded by a second horizontal folding assembly, FIG. 12 is a view illustrating a state in which the garment in FIG. 11 is withdrawn upward after being folded by the second horizontal folding assembly, FIG. 13 is a view illustrating a state in which the garment in FIG. 12 is folded by a first horizontal folding assembly, and FIG. 14 is a view illustrating a state in which the garment in FIG. 13 is withdrawn downward after being folded by the first horizontal folding assembly.

Referring to the drawings, the horizontal folding assembly according to the present disclosure includes a first conveyor, a second conveyor, and a folding bar.

Specifically, the first conveyor is configured to convey the garment in the horizontal direction, the second conveyor is disposed to be spaced apart from the first conveyor in the horizontal direction, and the folding bar is inserted into a separation space between the first conveyor and the second conveyor. At least one conveyance surface of the first conveyor is inclined, and at least one conveyance surface of the second conveyor is disposed to face the inclined conveyance surface of the first conveyor.

According to the embodiment illustrated in FIG. 8, the horizontal folding assembly includes a first horizontal folding assembly 241 and a second horizontal folding assembly 242. In the first horizontal folding assembly 241, a front conveyor 24-1, an intermediate conveyor 24-2, and a rear conveyor 24-3 are provided to be spaced apart from each other in a longitudinal direction, and a first folding bar inserted into a first folding gap 243 which is a separation space between the front conveyor 24-1 and the intermediate conveyor 24-2. In the second horizontal folding assembly 242, a second folding bar is inserted into a second folding gap 244, which is a separation space between the intermediate conveyor 24-2 and the rear conveyor 24-3. Therefore, a structural configuration for performing a ⅓ point horizontal folding process (see S5 in FIG. 17) and a ½ point horizontal folding process (see S6 in FIG. 17) on a target garment in the single folding layer is provided.

At least one conveyance surface of the intermediate conveyor 24-2 may be inclined. Referring to the embodiment illustrated in FIG. 9, in the conveyance surface constituting the intermediate conveyor 24-2, the conveyance surface facing the rear conveyor 24-3 may be inclined. As described above, since the intermediate conveyor 24-2 has the inclined conveyance surface (hereinafter, referred to as an 'inclined surface'), a structure capable of continuously performing the folding operation twice in a limited horizontal space is provided. In other words, a primary horizontal folding process may be performed in any one folding layer, and then a subsequent horizontal folding process may be performed in the same folding layer.

The conveyance surface of the rear conveyor 24-3, which faces the inclined surface of the intermediate conveyor 24-2, may also be inclined. That is, one of the conveyance surfaces of the rear conveyor 24-3 may be inclined to correspond to the inclined surface of the intermediate conveyor 24-2. The inclined surface of the intermediate conveyor 24-2 and the inclined surface of the rear conveyor 24-3 may be disposed in parallel with each other at a predetermined interval D2. As described above, since the inclined surfaces of the two adjacent conveyors are provided to face each other, the folded garment may be withdrawn to the top side of the conveyors without being unfolded or damaged in the state in which the garment is folded when the folded garment is pulled out. Further, a sufficient frictional force may be applied, thereby preventing the garment from being jammed between the two conveyors and preventing a breakdown caused by the dropped garment.

The two inclined surfaces are provided on the two adjacent conveyors. In the above-mentioned embodiment in FIG. 9, the two inclined surfaces may be provided on the intermediate conveyor 24-2 and the rear conveyor 24-3. Of course, as another embodiment, the two inclined surfaces may be provided on the intermediate conveyor 24-2 and the front conveyor 24-1.

Meanwhile, in the horizontal folding assembly according to the present disclosure, the first conveyor is provided to convey the garment in the horizontal direction, the second conveyor is spaced apart from the first conveyor in the horizontal direction, and the folding bar is inserted into the separation space between the first conveyor and the second conveyor. The first conveyor is formed in a triangular shape, the second conveyor is formed in an inverted triangular shape, and the inclined surfaces of the first and second conveyors are disposed to face each other.

Specifically, according to the embodiment illustrated in FIG. 9, the intermediate conveyor 24-2 may be formed in a triangular shape, the rear conveyor 24-3 disposed adjacent to the intermediate conveyor 24-2 may be formed in an inverted triangular shape. Therefore, at least one of the conveyance surfaces of the intermediate conveyor 24-2 and the rear conveyor 24-3 may constitute the inclined surface. The inclined surface of the intermediate conveyor 24-2 and the inclined surface of the rear conveyor 24-3 may be disposed in parallel with each other at a predetermined interval D2. As described above, the conveyor having a triangular shape and the conveyor having an inverted triangular shape are disposed to face each other. Therefore, when the garment folded by the operations of the two conveyors is pulled out, the garment in the folded state may be withdrawn to the top side of the conveyors without being unfolded or damaged. Further, a sufficient frictional force may be applied, thereby preventing the garment from being jammed between the two conveyors and preventing a breakdown caused by the dropped garment.

The conveyor having a triangular shape and the conveyor having an inverted triangular shape are disposed to face each other. In the above-mentioned embodiment in FIG. 9, the two inclined surfaces may be provided on the intermediate conveyor 24-2 and the rear conveyor 24-3. Of course, as another embodiment, the two inclined surfaces may be provided on the intermediate conveyor 24-2 and the front conveyor 24-1.

According to the embodiment illustrated in FIG. 9, the second folding gap 244 having a predetermined interval D2 is provided between the inclined surface of the intermediate conveyor 24-2 and the inclined surface of the rear conveyor 24-3, and the first folding gap 243 having a predetermined interval D1 is also provided between the intermediate conveyor 24-2 and the front conveyor 24-1. The interval D1 of the first folding gap 243 means a predetermined interval that enables the garment to be pulled downward, folded, and then immediately dropped.

Referring to FIG. 9, the inclined surface may have a predetermined angle K with respect to a lower horizontal surface of the intermediate conveyor 24-2. Since the inclined surface of the rear conveyor 24-3 is parallel to the inclined surface of the intermediate conveyor 24-2, the angle K may be provided.

The angle K of the inclined surface may be 45 degrees or less. If the angle K of the inclined surface exceeds 45 degrees, there occurs a technical malfunction in which the garment is unfolded by a frictional force applied by the conveyance surface of the conveyor or gravity during a process of withdrawing the folded garment to the top side.

The angle K of the inclined surface may be 10 degrees or more. If the angle K of the inclined surface is less than 10 degrees, there occurs a technical malfunction in which a size of the folding gap substantially applied to the garment placed on the conveyor (an interval based on the upper surface of the conveyor) is increased, the garment is inserted into the folding gap without bypassing the folding gap. According to the request of the user, the ⅓ point horizontal folding process (see S5 in FIG. 17) may be omitted, and the ½ point horizontal folding process may be performed. However, because the loaded garment cannot bypass the increased folding gap, which inevitably leads to a failure of the intended horizontal folding process.

In addition, if the angle K of the inclined surface is less than 10 degrees, the distance D2 between the two inclined surfaces is relatively decreased. For this reason, the types of garments, which may be actually inserted between the two inclined surfaces, are remarkably limited or the insertion of the garment becomes impossible. Further, in a case in which a height of the conveyor is constant, required lengths of the two conveyors are inevitably increased as the angle K of the inclined surface decreases, which degrades the miniaturization of the apparatus.

The angle K of the inclined surface may be 30 to 35 degrees. Therefore, in the embodiment illustrated in FIG. 9, the first folding gap 243 is positioned at a ½ point based on the longitudinal direction of the conveyor 20, such that the intended ½ point horizontal folding process may be performed by the first horizontal folding assembly 241, and folding quality is ensured when the garment is withdrawn to the top side by the ⅓ point horizontal folding process. Further, as necessary, the interval of the second folding gap 244 may be ensured to enable the garment to bypass the ⅓ point horizontal folding process. Further, the conveyors, together with the other folding layers, may be accommodated in the frame with the limited size, which makes it possible to miniaturize the apparatus.

An operation mechanism of the horizontal folding assembly according to the above-mentioned embodiment will be described with reference to FIGS. 10 to 14. The embodiment will be described in which the horizontal folding process is performed at the ⅓ point first, and then horizontal folding process is performed at the ½ point.

The garment C, which is dropped from the adjacent upper folding layer onto the front conveyor 24-1, is deployed rearward (the direction indicated in FIG. 10). In this case, the garment may bypass the first folding gap 243 and the second folding gap 244 having the predetermined intervals D1 and D2 (see FIG. 10).

Next, the folding bar 2423 is operated downward by the rotation A2 of the connecting rod 2424 of the second horizontal folding assembly 242, and at the same time, the intermediate conveyor 24-2 and the rear conveyor 24-3 respectively rotate clockwise and counterclockwise (A42 and A43), such that the garment is folded based on the ⅓ point, and the garment is inserted between the inclined surface of the intermediate conveyor 24-2 and the inclined surface of the rear conveyor 24-3 (see FIG. 11).

Next, the folding bar 2423 of the second horizontal folding assembly 242 moves upward to the original position, and at the same time, the intermediate conveyor 24-2 and the rear conveyor 24-3 respectively rotate outward counterclockwise to clockwise (A42 and A43), such that the garment on which the ⅓ point horizontal folding process has been completely performed is withdrawn to the top side of the conveyors in the state in which the garment is folded (see FIG. 12).

Next, the folding bar 2413 is operated downward by the rotation A2 of the connecting rod 2414 of the first horizontal folding assembly 241, and at the same time, the front conveyor 24-1 and the intermediate conveyor 24-2 respectively rotate clockwise to counterclockwise (A41 and A42), such that the garment on which the ⅓ point folding process has been completely performed is folded again based on the ½ point, and the garment is dropped through the interval D1 between the front conveyor 24-1 and the intermediate conveyor 24-2 (see FIG. 13).

Lastly, the garment C, on which the ⅓ point horizontal folding process and the ½ point horizontal folding process have been completely performed, is conveyed to the other folding layers, and then the subsequent folding processes are performed. Alternatively, in the embodiment illustrated in FIG. 14, the garment is loaded onto the support conveyor 25 that may be moved horizontally, such that the garment may be delivered to the unloading assembly 300.

Figure 15:
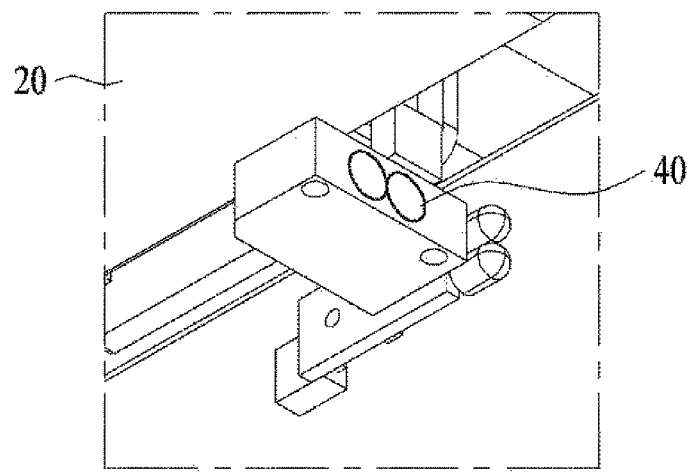
FIG. 15 is a view illustrating a garment detection sensor disposed in the horizontal folding assembly according to the embodiment of the present disclosure.
Figure 16:
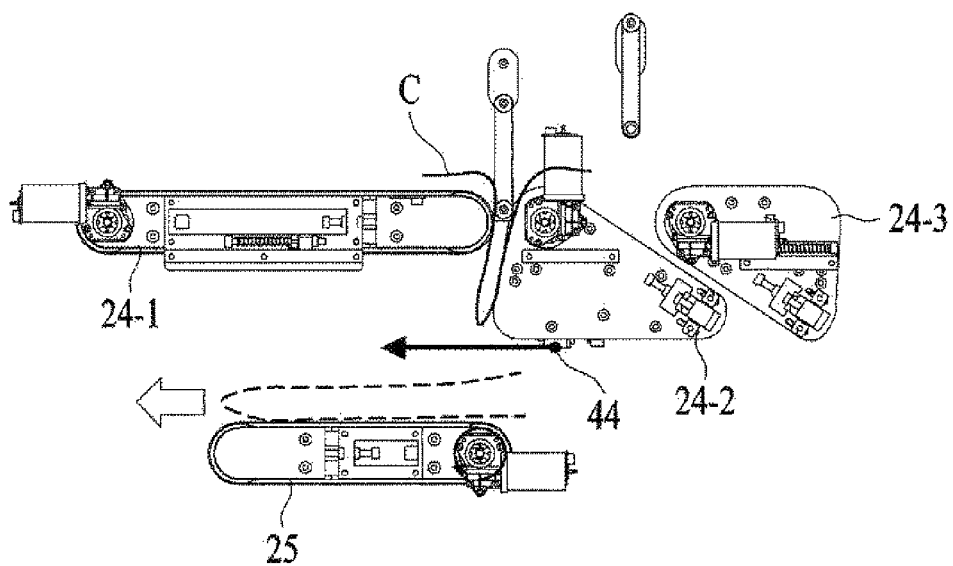
FIG. 16 is a side view illustrating a state in which the garment detection sensor in FIG. 15 operates.

FIG. 15 is a view illustrating a garment detection sensor disposed on the horizontal folding assembly related to the first technical object according to the embodiment of the present disclosure, and FIG. 16 is a side view illustrating a state in which the garment detection sensor operates.

Referring to these drawings, the garment detection sensor 40 may be provided in plural, and the plurality of detection sensors may be configured to detect a position of the garment, a position of the assembly, pressure, or the like in the loading assembly 100, the folding assembly 200, and the unloading assembly 300. The plurality of garment detection sensors is provided to detect a position or length of the garment conveyed by the folding assembly 200 and an exact position of the vertical folding assembly or the horizontal folding assembly.

Specifically, the horizontal folding assembly may have the garment detection sensors. The detection sensor may accurately detect a horizontally folded portion of the garment C, such that the garment C may be positioned in the folding gaps 243 and 244.

The folding assembly 200 includes a plurality of garment detection sensors 40 to detect the positions of the garments. The garment detection sensor 40 may be configured as an infrared (IR) sensor.

In the embodiment illustrated in FIG. 15, the garment detection sensor may be provided at a lower side of the conveyor 20. The garment detection sensor may be provided on a support portion protruding downward between the conveyor belts so that infrared rays may propagate in the horizontal direction. The garment detection sensor may detect the garment dropped from the conveyor, thereby recognizing whether the garment has been normally folded or whether the garment is jammed.

In the embodiment illustrated in FIG. 16, a garment detection sensor 44 may be provided at a lower side of the conveyor 24 provided in the horizontal folding assembly. Specifically, a horizontal transmission garment detection sensor may be applied to the embodiment illustrated in FIG. 15.

In addition, the garment detection sensor 44 may be provided on the support portion protruding downward from the intermediate conveyor 24-2 so that the infrared rays may propagate in the horizontal direction. As described above, the garment detection sensor provided at the lower side of the conveyor 24 may detect the garment C passing through the folding gaps 243 and 244, thereby recognizing whether the garment C has been normally folded horizontally or whether the garment is jammed.

Figure 17:
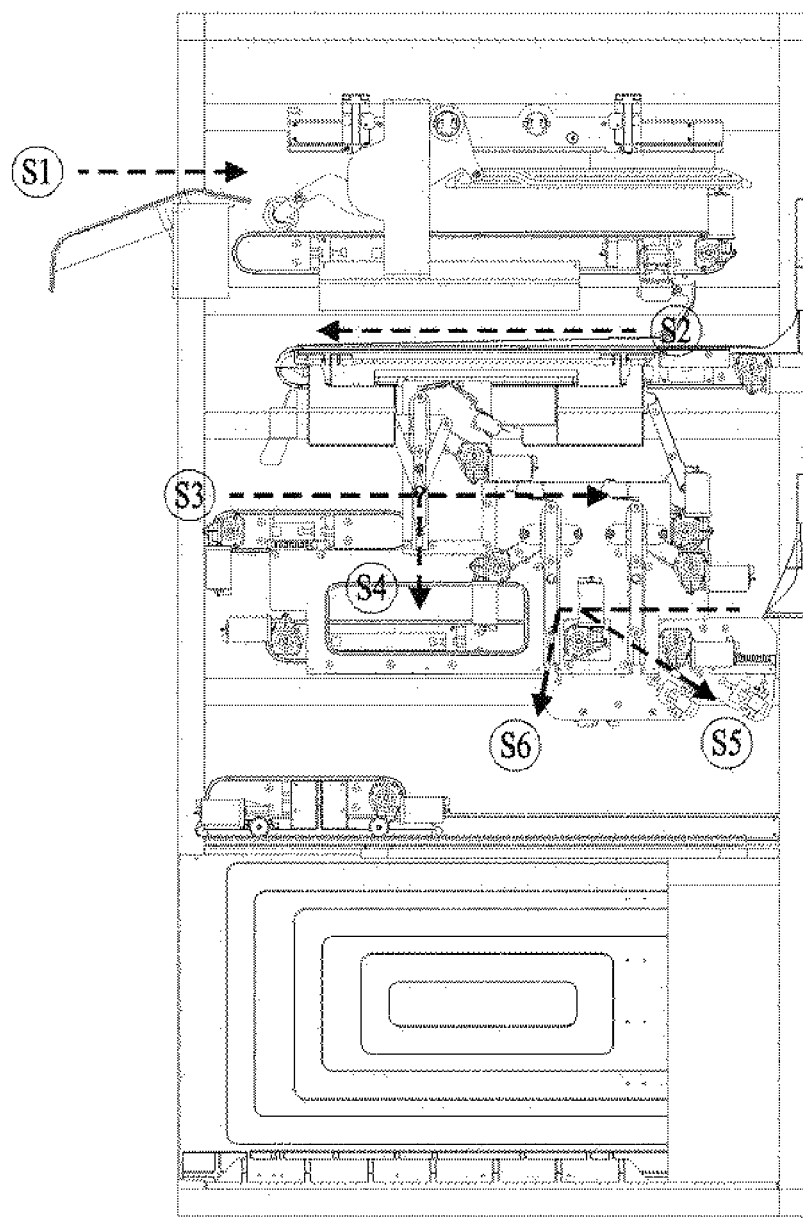
FIG. 17 is a conceptual view illustrating a garment folding method using the garment folding apparatus.
Figure 18:
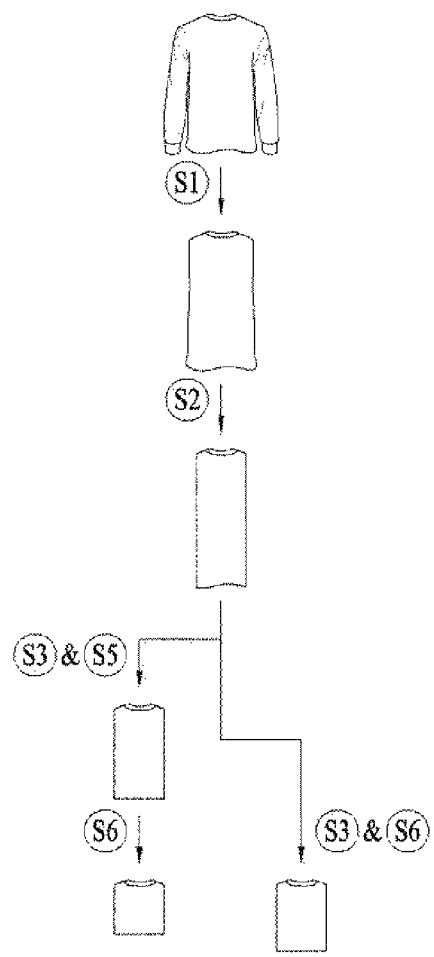
FIG. 18 is a flowchart illustrating one embodiment of the garment folding method.
Figure 19:
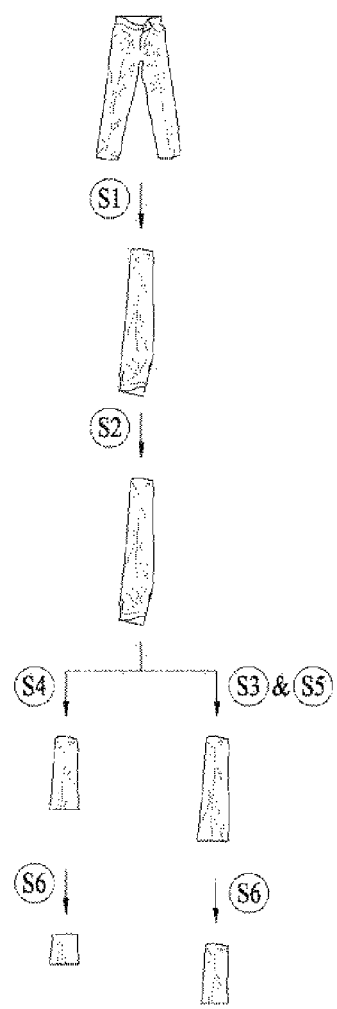
FIG. 19 is a flowchart illustrating another embodiment of the garment folding method.
Figure 20:
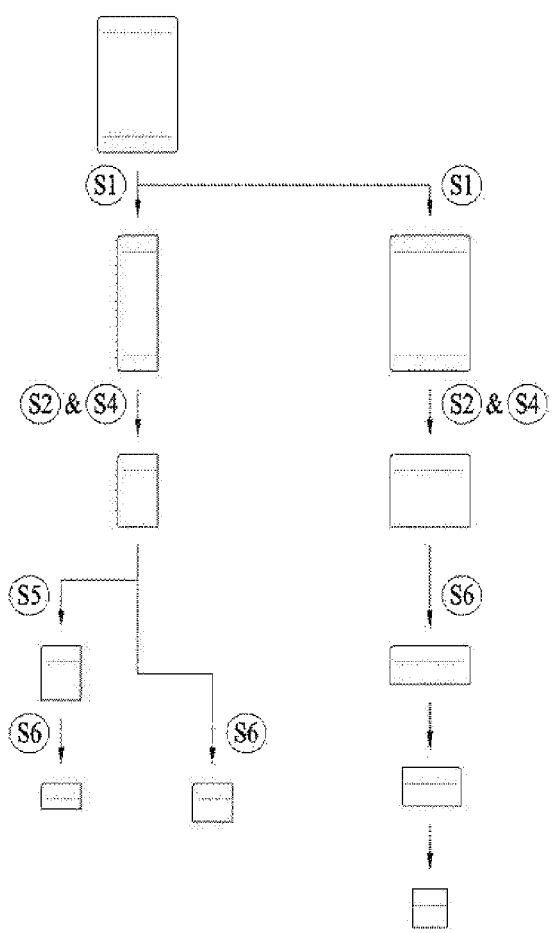
FIG. 20 is a flowchart illustrating still another embodiment of the garment folding method.

FIGS. 17 to 20 are views illustrating various garment folding methods using the garment folding apparatus according to the present disclosure, in which FIG. 17 is a conceptual view illustrating positions in the folding assembly at which the folding process is performed, FIG. 18 is a flowchart illustrating a garment folding method of folding upper garments as an embodiment, FIG. 19 is a flowchart illustrating a garment folding method of folding lower garments as an embodiment, and FIG. 20 is a flowchart illustrating a garment folding method of folding towels as an embodiment.

According to the embodiment of the folding assembly 200, the method of folding the garment loaded into the garment folding apparatus according to the present disclosure includes: a first vertical folding step S1 of folding the garment in the first folding layer 210; a second vertical folding step S2 of folding the garment in the second folding layer 220; a first horizontal folding step S3 and S4 of folding the garment in the third folding layer 230; and a second horizontal folding step S5 and S6 of folding the garment in the fourth folding layer 240.

The first horizontal folding step S3 and S4 includes a conveyance step S3 of conveying the garment to the lower folding layer without folding the garment, and a folding step S4.

The second horizontal folding step S5 and S6 includes a ⅓ folding step S5 of folding the garment at a ⅓ point based on the conveyance direction, and a ½ folding step S6 of folding the garment at a ½ point based on the conveyance direction.

As described above, in one embodiment, the horizontal folding assembly according to the present disclosure may be provided to perform the second horizontal folding steps S5 and S6.

In the embodiment illustrated in FIG. 18, the upper garment loaded into the garment folding apparatus according to the present disclosure may be vertically folded in the first vertical folding step S1 and the second vertical folding step S2. Thereafter, the upper garment is horizontally folded. In this regard, two embodiments will be described.

According to the first embodiment, the vertically folded garment is conveyed immediately without being folded in the third horizontal folding step (S3), and then sequentially subjected to the ⅓ folding step S5 and the ½ folding step S6 in the fourth horizontal folding step, such that the upper garment, which is completely horizontally folded in three stages, may be unloaded (see the left flowchart in FIG. 18).

According to the second embodiment, the vertically folded garment is conveyed immediately without being folded in the third horizontal folding step (S3), and then subjected only to the ½ folding step S6 in the fourth horizontal folding step, such that the upper garment, which is completely horizontally folded in four stages, may be unloaded (see the right flowchart in FIG. 18).

In the embodiment illustrated in FIG. 19, the lower garment loaded into the garment folding apparatus according to the present disclosure may be vertically folded once while passing through the first vertical folding step S1 and the second vertical folding step S2. That is, in the second vertical folding step S2, the towel is immediately conveyed without being folded by the vertical folding assembly. Thereafter, the lower garment is horizontally folded. In this regard, two embodiments will be described.

According to the first embodiment, the vertically folded garment is horizontally folded in the third horizontal folding step S4 and then horizontally folded in the ½ folding step S6 in the fourth horizontal folding step, such that the lower garment, which is completely horizontally folded in four stages, may be unloaded (see the left flowchart in FIG. 19).

According to the second embodiment, the vertically folded garment is conveyed immediately without being folded in the third horizontal folding step S3 and then sequentially subjected to the ⅓ folding step S5 and the ½ folding step S6 ⅓ folding step S5 and the ½ folding step S6 in the fourth horizontal folding step, such that the lower garment, which is completely horizontally folded in three stages, may be unloaded (see the right flowchart in FIG. 19).

In the embodiment illustrated in FIG. 20, the towel loaded into the garment folding apparatus according to the present disclosure is subjected to the vertical and horizontal folding steps. In this regard, three embodiments will be described.

According to the first embodiment, the loaded towel may be vertically folded once while passing through the first vertical folding step S1 and the second vertical folding step S2. That is, in the second vertical folding step S2, the towel is immediately conveyed without being folded by the vertical folding assembly. Next, after the towel is horizontally folded in the third horizontal folding step S4, the towel is sequentially subjected to the ⅓ folding step S5 and the ½ folding step S6 in the fourth horizontal folding step, such that the towel having a hand towel size and shape for being stored in a bathroom cabinet may be unloaded (see the left flowchart in FIG. 20).

According to the second embodiment, the loaded towel may be vertically folded once while passing through the first vertical folding step S1 and the second vertical folding step S2. That is, in the second vertical folding step S2, the towel is immediately conveyed without being folded by the vertical folding assembly. Next, after the towel is horizontally folded in the third horizontal folding step S4, the towel is immediately subjected to the ½ folding step S6 in the fourth horizontal folding step, such that the towel may be unloaded as a hand towel different in size and shape from the hand towel according to the first embodiment (see the intermediate flowchart in FIG. 20).

According to the third embodiment, the loaded towel is conveyed immediately without being vertically folded while passing through the first vertical folding step S1 and the second vertical folding step S2. Thereafter, after the towel is horizontally folded in the third horizontal folding step S4, the towel is immediately subjected to the ½ folding step S6 in the fourth horizontal folding step, such that the towel different in size and shape from the hand towels according to the first and second embodiments may be unloaded (see the right flowchart in FIG. 20). As another embodiment, the vertical folding layer may be further provided below the fourth folding layer so that the vertical folding process is additionally performed after the horizontal folding process is completed. In this case, a hand towel having a smaller vertical width than the towel according to the third embodiment may be unloaded and appropriately stored in an intended bathroom cabinet.

Hereinafter, regarding the second technical object, the horizontal folding layers 230 and 240 and the conveyor structure 400 included in the horizontal folding layers 230 and 240 will be described in detail.

Figure 21:
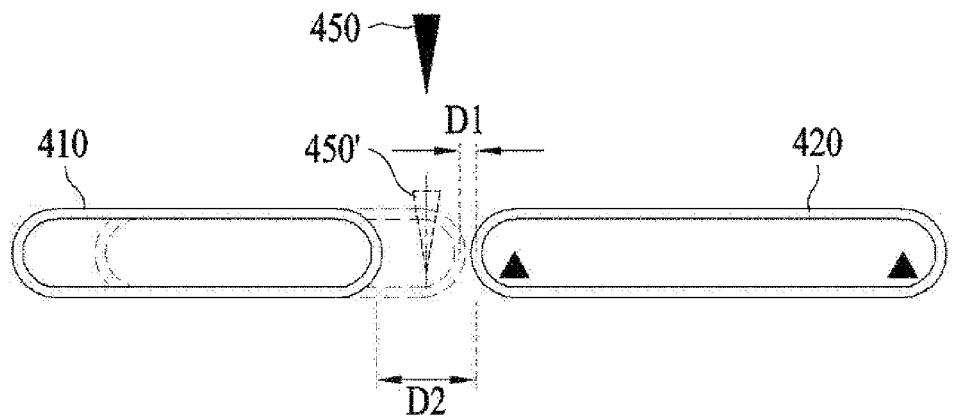
FIG. 21 is an explanatory view briefly illustrating a conveyor structure related to a second technical object according to the embodiment of the present disclosure.
Figure 22:
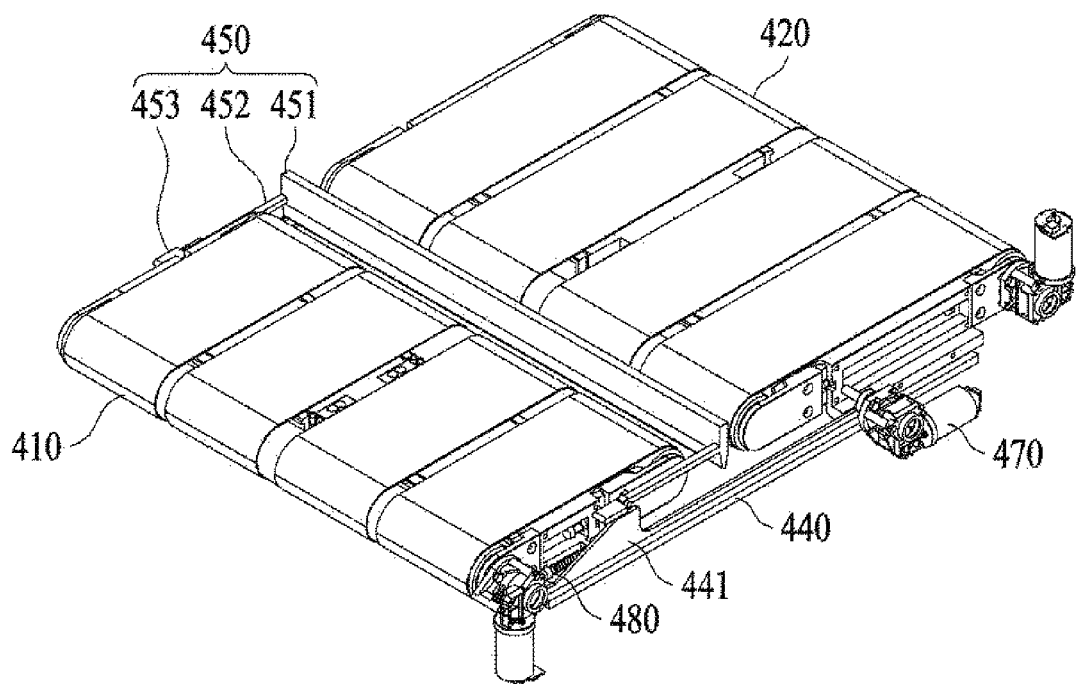
FIG. 22 is a perspective view illustrating a state in which a blade is inserted in the conveyor structure in FIG. 21.
Figure 23:
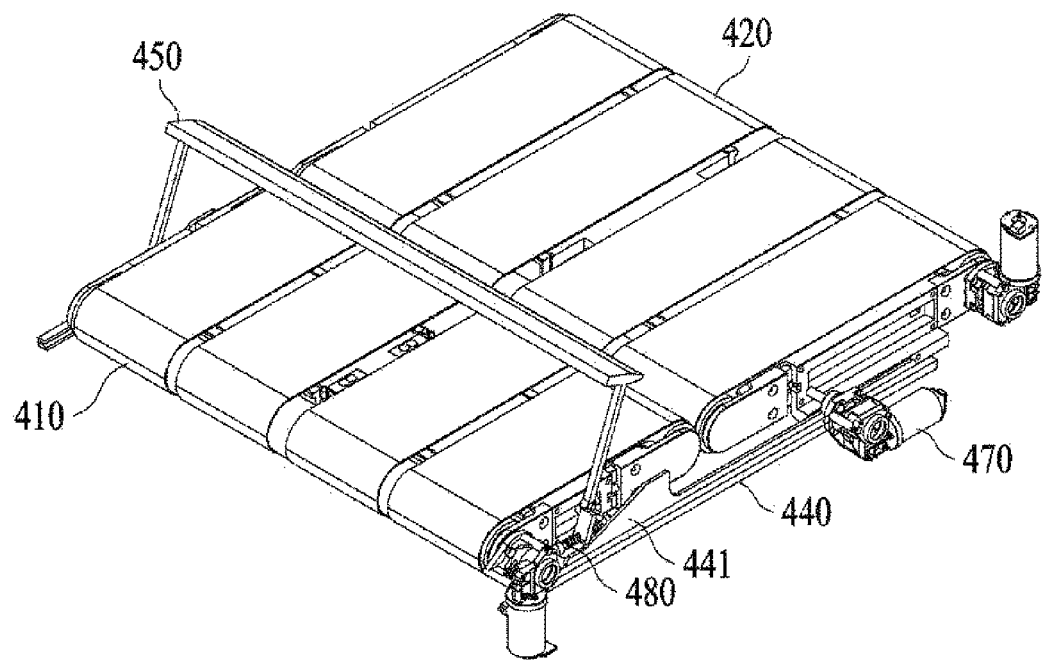
FIG. 23 is a perspective view illustrating a state before the blade is inserted in the conveyor structure in FIG. 21.
Figure 24:
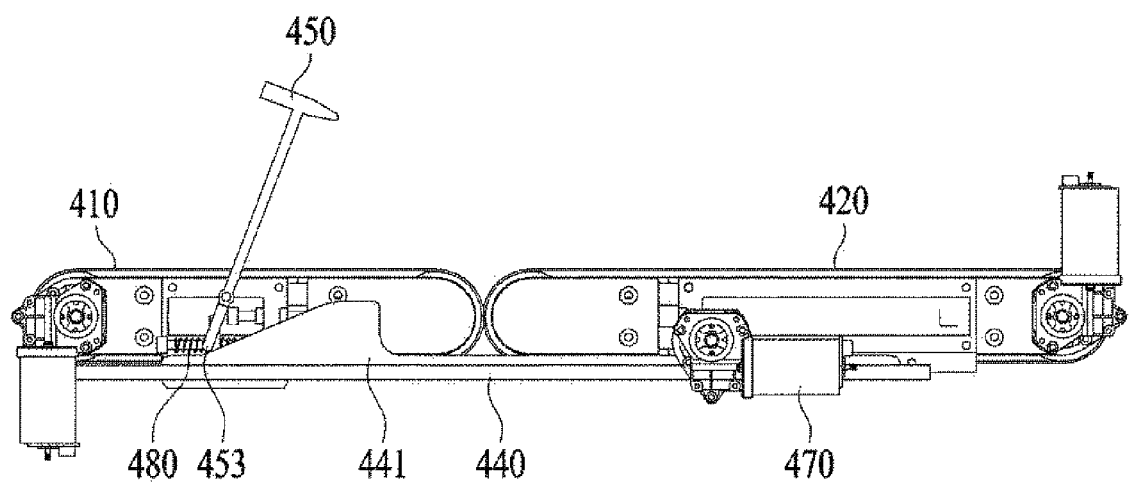
FIG. 24 is a side view illustrating a state before the blade is inserted in the conveyor structure in FIG. 21.

FIG. 21 is an explanatory view briefly illustrating a conveyor structure related to a second technical object according to the embodiment of the present disclosure, FIG. 22 is a perspective view illustrating a state in which a blade is inserted in the conveyor structure in FIG. 21, FIG. 23 is a perspective view illustrating a state before the blade is inserted in the conveyor structure in FIG. 21, and FIG. 24 is a side view illustrating a state before the blade is inserted in the conveyor structure in FIG. 21.

Referring to these drawings, the conveyor structure 400 includes a stationary conveyor 420, a sliding conveyor 410 configured to operate to move away from the stationary conveyor 420 in the horizontal direction, and a blade 450 configured to operate to be inserted into a separation space between the sliding conveyor 410 and the stationary conveyor 420.

The sliding conveyor 410 may be operated in the horizontal direction by a drive motor 470. The sliding conveyor 410 may be operated by the drive motor 470 and reciprocate in the horizontal direction together with a movable rail unit 440 to be described below. Therefore, the sliding conveyor 410 may define a folding gap or change a spacing distance of the folding gap in cooperation with the stationary conveyor 420.

An interval between the two conveyors in a state in which the sliding conveyor 410 in close contact with the stationary conveyor 420 is defined as a first spacing distance D1. The first spacing distance D1 means a minimum interval that enables the two conveyors to normally operate while rotating without interfering with each other. When the first spacing distance D1 (hereinafter, also referred to as a 'minimum spacing distance') is set between the two conveyors, the garment may bypass the folding gap without falling or being inserted into the folding gap.

An interval between the two conveyors when the sliding conveyor 410 is maximally moved away from the stationary conveyor 420 is defined as a second spacing distance D2 (hereinafter, also referred to as a 'maximum spacing distance'). The second spacing distance D2 means an interval that enables the garment to be sufficiently inserted between the two front and rear conveyors based on the blade 450 by means of the operation of the blade 450 for inserting the garment. When the second spacing distance D2 is set between the two conveyors, the garment, which may be made of various materials and have various thicknesses, may be folded without bypassing the folding gap.

The blade 450 may be inserted to be directed toward a central portion of the second spacing distance D2. In this case, the intervals between the front and rear sides and the blade 450 are equal to each other, such that a range of the thickness of the garment which can be folded may be maximized when the spacing distance D2 remains the same.

As described above, the sliding conveyor 410 maintains a minimum spacing distance from the stationary conveyor 410 at normal times to allow the garment to smoothly bypass the folding gap. When the garment needs to be folded, the sliding conveyor 410 ensures a sufficient spacing distance in the horizontal direction from the stationary conveyor 410. Therefore, it is possible to implement a structural configuration capable of assuredly folding even a thick garment.

In addition, when the sliding conveyor 410 moves in the horizontal direction to the maximum spacing distance, the blade 450 moves downward while operating in conjunction with the sliding conveyor 410. Therefore, the blade 450 may be controlled so that the blade 450 does not operate when the sliding conveyor 410 maintains the minimum spacing distance, and the blade 450 operates only when the sliding conveyor 410 maintains the maximum spacing distance. Since the sliding conveyor 410 and the blade 450 operate simultaneously, it is possible to implement the structural configuration capable of accurately folding the garments having various thicknesses and made of various materials at an intended point without malfunction, in comparison with a conveyor structure in the related art in which both the two conveyors are fixed at a predetermined interval or a conveyor structure in which a blade operates independently of a conveyor.

Specifically, the blade 450 may be automatically inserted into the folding gap only when the sliding conveyor 410 ensures the second spacing distance D2 from the stationary conveyor 420. In this case, as described above, the blade 450 may be inserted to be directed toward the central portion of the second spacing distance D2.

The process in which the blade 450 operates in conjunction with the sliding conveyor 410 may be implemented by the configuration including: the movable rail unit 440 configured to be operated by the drive motor 470 and move in the horizontal direction together with the sliding conveyor 410; a cam 441 provided on the movable rail unit 440; and a hinge unit 453 included in the blade 450 and configured to be rotated by the movement of the cam 441.

The movable rail unit 440 may be configured as a rack-pinion structure so that the movable rail unit 440 may move in the horizontal direction together with the sliding conveyor 410.

One surface of the cam 441, which is in contact with the hinge unit 453, may be inclined so that the cam 441 enables the blade 450 to be rotated by the movable rail unit 440 that moves in the horizontal. That is, the cam 441 may have an inclined surface inclined upward in the longitudinal direction toward the stationary conveyor 420.

The blade 450 may include an insertion part 451 configured to be inserted into the folding gap having the ensured maximum spacing distance D2, and a connection part 452 configured to integrally connect the hinge unit 453 and the insertion part 451.

The conveyor structure 400 may further include a spring 480 (see FIG. 24) configured to provide an elastic force to move the sliding conveyor 410 to an initial position. That is, since the spring 480 is provided, the sliding conveyor 410, which maintains the maximum spacing distance D2 by being operated by the drive motor 470, may quickly and conveniently return to the original position to have the minimum spacing distance D1, when necessary.

Therefore, to perform the folding process of a thick garment, the sliding conveyor 410 is moved first from the stationary conveyor 410 by the drive motor 470 so that the maximum spacing distance D2 is ensured. At the same time, the blade 450 pushes down the corresponding portion of the garment. Thereafter, the sliding conveyor 410 is maximally moved toward the stationary conveyor 420 by the spring 480 while ensuring a distance corresponding to a thickness of the blade 450 and a thickness of the garment surrounding the blade 450. An outer surface of the garment, which is inserted into the folding gap by the blade 450, receives a sufficient frictional force from the two conveyors 410 and 420 being in close contact with each other, such that the garment may be withdrawn downward in the state in which the garment is completely folded.

Therefore, even though the garments having various thicknesses and made of various materials are loaded, the conveyor structure capable of treating the garments may be provided, such that the garment may be accurately and perfectly folded at the intended point. In particular, according to the folding assembly according to the present disclosure, the folding gap may be sufficiently ensured and the blade may operate in conjunction with the folding gap, such that the horizontal folding process may be performed even on the thick garment or the garment made of a material with a low frictional force. Therefore, it is possible to ensure horizontal folding quality optimized for the respective garments.

Figure 25:
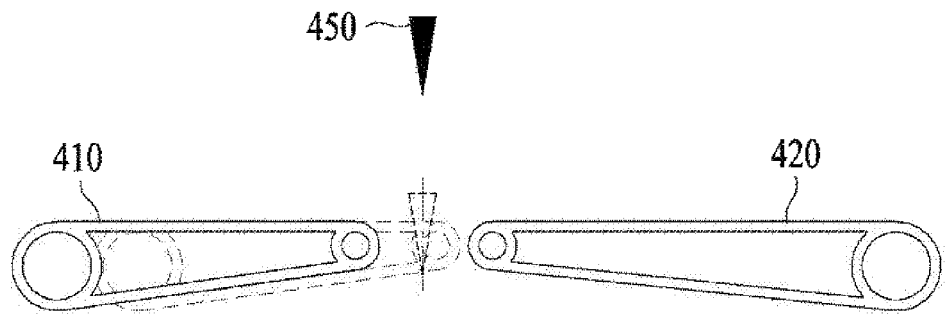
FIG. 25 is an explanatory view briefly illustrating a conveyor structure related to the second technical object according to another embodiment.

FIG. 25 is an explanatory view briefly illustrating a conveyor structure related to the second technical object according to another embodiment.

Referring to FIG. 25, among rollers constituting the sliding conveyor 410 and the stationary conveyor 420, a diameter of the roller positioned at the inside may be smaller than a diameter of the roller positioned at the outside. Therefore, a curved surface of the roller may be minimized, such that the garment is not inadvertently inserted or jammed when the garment is conveyed between the two conveyors or bypasses the portion between the two conveyors.

In the embodiment illustrated in FIG. 21, when the folding process is required, the conveyor structure 400, which includes the stationary conveyor 420, the sliding conveyor 410 configured to operate to move away from the stationary conveyor 420 in the horizontal direction, and the blade 450 configured to be inserted into the separation space between the sliding conveyor 410 and the stationary conveyor 420, is basically operated. Further, when the sliding conveyor 410 moves in the horizontal to the maximum spacing distance, the blade 450 operates in conjunction with the operation of the sliding conveyor 410 and moves downward. Therefore, the folding process may be accurately performed on the garments having various thicknesses and made of various materials at the intended point without malfunction.

In the embodiment illustrated in FIG. 25, the above-mentioned folding function is provided, and the inner conveyor roller and the inner conveyor roller have different diameters, such that the bypass function of the garment may be further improved.

Figure 26:
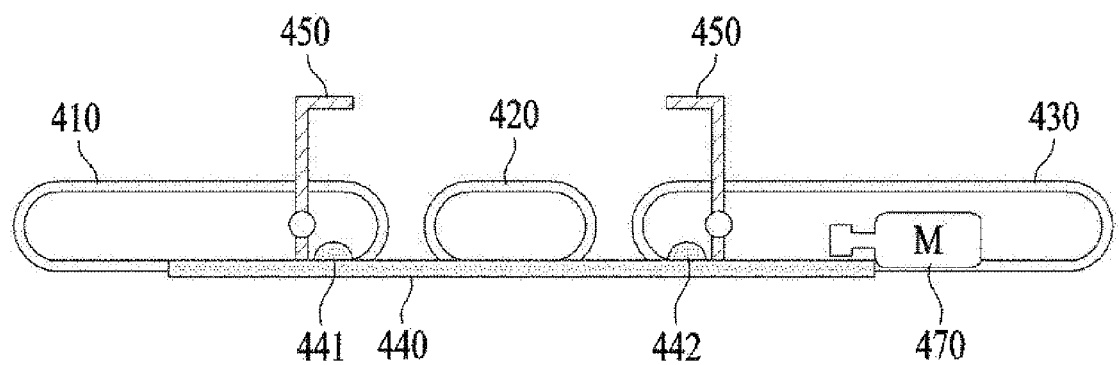
FIG. 26 is an explanatory view briefly illustrating a conveyor structure related to the second technical object according to still another embodiment of the present disclosure.
Figure 27:
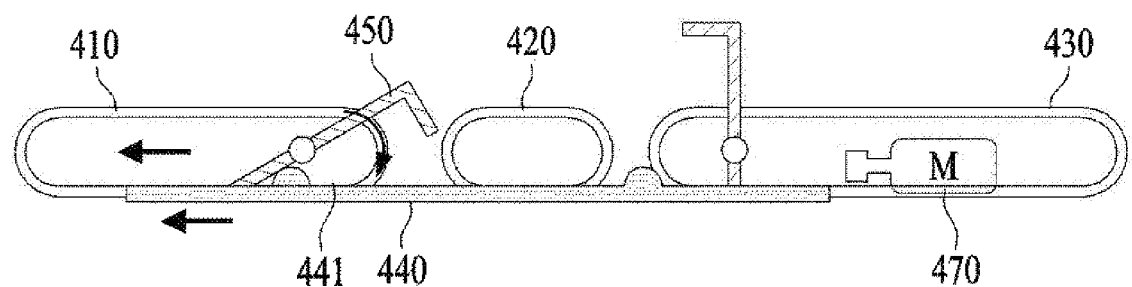
FIG. 27 is an explanatory view illustrating a state in which a first blade is inserted in the conveyor structure in FIG. 26.
Figure 28:
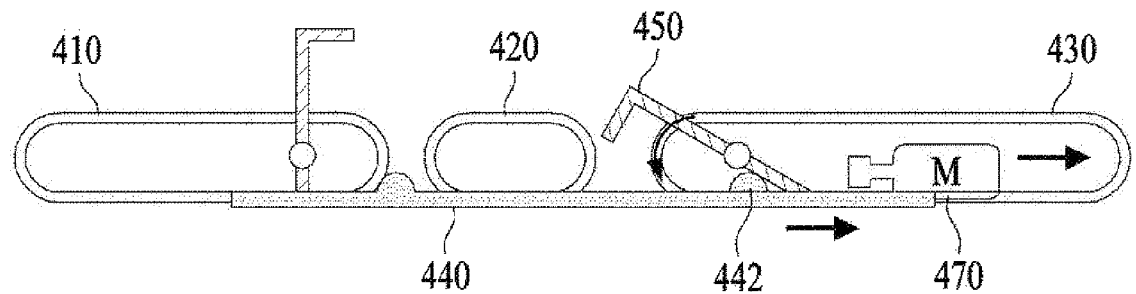
FIG. 28 is an explanatory view illustrating a state in which a second blade is inserted in the conveyor structure in FIG. 26.

FIG. 26 is an explanatory view briefly illustrating a conveyor structure related to the second technical object according to still another embodiment of the present disclosure, FIG. 27 is an explanatory view illustrating a state in which a first blade is inserted in the conveyor structure in FIG. 26, and FIG. 28 is an explanatory view illustrating a state in which a second blade is inserted in the conveyor structure in FIG. 26.

Referring to these drawings, the conveyor structure 400 may include: the stationary conveyor 420; a first sliding conveyor 410 configured to operate to move forward away from the stationary conveyor 420 in the horizontal direction; a second sliding conveyor 430 configured to operate move rearward away from the stationary conveyor 420 in the horizontal direction; a first blade 450 configured to be inserted into a separation space between the first sliding conveyor 410 and the stationary conveyor 420; and a second blade 450 configured to be inserted into a separation space between the second sliding conveyor 430 and the stationary conveyor 420.

According to the method of operating the first and second blades 450, when the first sliding conveyor 410 moves to the maximum spacing distance in the horizontal direction, the first blade 450 operates in conjunction with the operation of the first sliding conveyor 410 and moves downward. When the second sliding conveyor 430 moves to the maximum spacing distance in the horizontal, the second blade 450 operates in conjunction with the operation of the second sliding conveyor 430 and moves downward.

The first and second blades 450 may rotate in conjunction with the single movable rail unit 440. In this case, a first cam 441 and a second cam 442 may be provided on the movable rail unit 440 and disposed at a predetermined horizontal distance. Therefore, when the movable rail unit 440 is horizontally moved in a forward/rearward direction by the drive motor 470, the first cam 441 provided at the front side operates together with the hinge unit of the first blade 450 to allow the first blade 450 to rotate, such that the first blade 450 is inserted between the first sliding conveyor 410 and the stationary conveyor 420. Further, the second cam 442 provided at the rear side operates together with the hinge unit of the second blade 450 to allow the second blade 450 to rotate, such that the second blade 450 is inserted between the second sliding conveyor 430 and the stationary conveyor 420 at a time interval.

Similar to the embodiment illustrated in FIG. 21, springs (not illustrated) are respectively provided in the sliding conveyor, such that the sliding conveyors may return to appropriate positions to correspond to the thickness of the garment after the sliding conveyors ensure the maximum spacing distance D2 in cooperation with the stationary conveyor 420 by being operated by the drive motor 470. Specifically, the first sliding conveyor 410 maximally moved forward by the drive motor 470, as illustrated in FIG. 27, may be returned rearward to an original position by the spring (not illustrated), as illustrated in FIG. 28. In addition, the second sliding conveyor 420 maximally moved rearward by the drive motor 470, as illustrated in FIG. 28, may be returned forward to an original position by the spring (not illustrated), as illustrated in FIG. 26.

As described above, according to the embodiment illustrated in FIG. 26 in which the horizontal folding process is performed at the two points in the single folding layer, i.e., even in a case in which the two sliding conveyors and the single stationary conveyor are combined, the high-quality horizontal folding processes may be individually performed at a time difference by the configuration in which the horizontal movements of the sliding conveyors and the operations of the blades are performed in conjunction with each other. The high-quality horizontal folding process means that similar to the above-mentioned embodiment illustrated in FIG. 21, the accurate and perfect folding process may be performed at the intended point even though the garments having various thicknesses and made of various materials.

Figure 29:
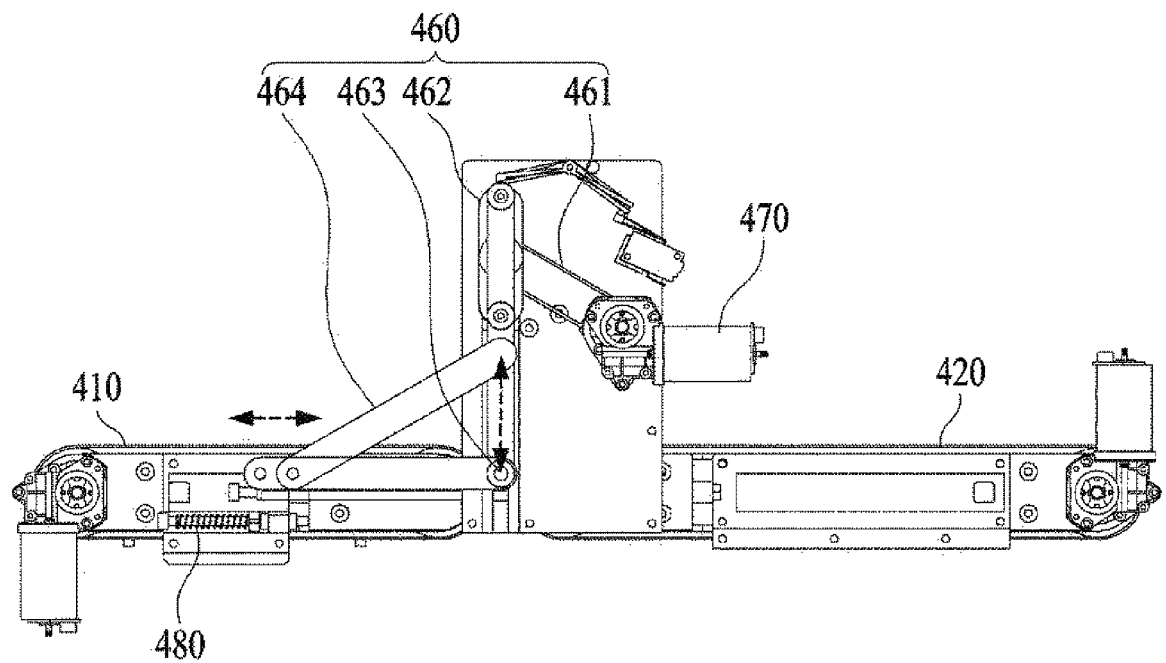
FIG. 29 is a side view illustrating a state in which a blade according to another embodiment is applied to the conveyor structure related to the second technical object according to the present disclosure.

FIG. 29 is a side view illustrating a state in which a blade according to another embodiment is applied to the conveyor structure related to the second technical object to be achieved by the present disclosure.

According to the embodiment illustrated in FIG. 29 these drawings, the conveyor structure 400 includes a stationary conveyor 420, a sliding conveyor 410 configured to operate to move away from the stationary conveyor 420 in the horizontal direction, and a blade 460 configured to operate to be inserted into a separation space between the sliding conveyor 410 and the stationary conveyor 420. In this case, when the sliding conveyor 410 moves in the horizontal direction to the maximum spacing distance (see the leftward horizontal arrow in FIG. 29), the blade 460 moves downward while operating in conjunction with the sliding conveyor 410 (see the downward vertical arrow in FIG. 29).

Specifically, the configuration for implementing the operation of the blade 460 may include: the drive motor 470; a timing belt 461 configured to transmit a rotational force generated by the drive motor 470; a connecting rod 462 configured to move the insertion part 463 upward or downward while being rotated by the timing belt 461; and a connection link 464 having one side connected to the insertion part 463 and the other side connected to the sliding conveyor 410.

When the insertion part 463 moves downward, the connection link 464 connected to the insertion part 463 provides a horizontal force so that the connection link 464 moves forward relative to the sliding conveyor 410. Therefore, the downward movement of the blade 460 is performed in conjunction with the horizontal movement of the sliding conveyor 410.

In addition, similar to the embodiment illustrated in FIG. 21, a spring 480 is provided in the sliding conveyor 410, such that the sliding conveyor 410 may return to an appropriate position to correspond to the thickness of the garment after the sliding conveyor 410 ensures the maximum spacing distance D2 in cooperation with the stationary conveyor 420 by being operated by the drive motor 470.

As described above, since the sliding conveyor and the blade operate in conjunction with each other, the accurate folding process may be performed on even the thick garment or the garment made of a material with a low frictional force at the intended point without malfunction when the horizontal folding needs to be performed on the garment at the corresponding point.

It is apparent to those skilled in the art that the present disclosure may be specified as other specific forms without departing from the spirit and the essential features of the present disclosure.

It should be appreciated that the detailed description is interpreted as being illustrative in every sense, not restrictive. The scope of the present disclosure should be determined based on the reasonable interpretation of the appended claims, and all of the modifications within the equivalent scope of the present disclosure belong to the scope of the present disclosure.

The invention claimed is:

1. A garment folding apparatus configured to fold a garment during a process of conveying the garment, the garment folding apparatus comprising:
    a loading assembly configured to load the garment;
    a folding assembly configured to fold the loaded garment while conveying the garment; and
    an unloading assembly disposed below the folding assembly and configured to unload a completely folded garment,
    wherein the folding assembly comprises:
        an intermediate conveyor configured to convey the garment in a horizontal direction,
        a rear conveyor spaced apart from the intermediate conveyor in the horizontal direction,
        a front conveyor disposed to be spaced apart from the intermediate conveyor in the horizontal direction,
        a first horizontal folding assembly including a first folding bar configured to be inserted into a first folding gap between the front conveyor and the intermediate conveyor, and
        a second horizontal folding assembly including a second folding bar configured to be inserted into a second folding gap between the intermediate conveyor and the rear conveyor,
    wherein at least one conveyance surface of the intermediate conveyor is inclined, and at least one conveyance surface of the rear conveyor is inclined and faces the at least one conveyance surface of the intermediate conveyor,
    wherein the at least one conveyance surface of the intermediate conveyor maintains a predetermined distance from the at least one conveyance surface of the rear conveyor,
    wherein the first folding gap has a predetermined interval to allow the garment to be withdrawn downward and folded, and
    wherein the first folding bar and the second folding bar are configured to operate independently.

2. The garment folding apparatus of claim 1, wherein the at least one conveyance surface of the intermediate conveyor is inclined at 10 to 45 degrees with respect to a horizontal plane.

3. The garment folding apparatus of claim 1, wherein the at least one conveyance surface of the intermediate conveyor is inclined at 30 to 35 degrees with respect to a horizontal plane.

4. The garment folding apparatus of claim 1, wherein the first folding gap is positioned at a ½ point based on a longitudinal direction of the front, intermediate, and rear conveyors, and the second folding gap is disposed rearward of the first folding gap and positioned at a ⅓ point based on the longitudinal direction.

5. The garment folding apparatus of claim 1, wherein the first horizontal folding assembly and the second horizontal folding assembly share a support piece.

6. The garment folding apparatus of claim 5, wherein the first horizontal folding assembly and the second horizontal folding assembly respectively have means for implementing upward and downward movements of the first folding bar and the second folding bar, and the means are symmetrically disposed with respect to the support piece.

7. A garment folding apparatus configured to fold a garment during a process of conveying the garment, the garment folding apparatus including:
- a loading assembly configured to load the garment;
- a folding assembly configured to fold the loaded garment while conveying the garment; and
- an unloading assembly disposed below the folding assembly and configured to unload a completely folded garment,
- wherein the folding assembly includes:
  - an intermediate conveyor configured to convey the garment in a horizontal direction, the intermediate conveyor having a triangular shape,
  - a rear conveyor disposed to be spaced apart from the intermediate conveyor in the horizontal direction, the rear conveyor having an inverted triangular shape,
  - a front conveyor spaced apart from the intermediate conveyor in the horizontal direction,
  - a first horizontal folding assembly including a first folding bar configured to be inserted into a first folding gap between the front conveyor and the intermediate conveyor, and
  - a second horizontal folding assembly including a second folding bar configured to be inserted into a second folding gap between the intermediate conveyor and the rear conveyor, and
- wherein an inclined surface of the intermediate conveyor faces an inclined surface of the rear conveyor and maintains a predetermined interval from the inclined surface of the rear conveyor.

8. The garment folding apparatus of claim 7, wherein the inclined surface of the intermediate conveyor is inclined at 10 to 45 degrees with respect to a horizontal plane.

9. The garment folding apparatus of claim 7, wherein the inclined surface of the intermediate conveyor is inclined at 30 to 35 degrees with respect to a horizontal plane.

10. A garment folding apparatus configured to fold a garment during a process of conveying the garment, the garment folding apparatus comprising:
- a loading assembly configured to load the garment;
- a folding assembly configured to fold the loaded garment while conveying the garment; and
- an unloading assembly disposed below the folding assembly and configured to unload a completely folded garment,
- wherein the folding assembly comprises a conveyor structure in which two or more conveyors are disposed in a horizontal direction,
- wherein the conveyor structure comprises:
  - a stationary conveyor,
  - a sliding conveyor configured to operate to move away from the stationary conveyor in the horizontal direction,
  - a blade configured to operate to be inserted into a separation space between the sliding conveyor and the stationary conveyor,
  - a movable rail configured to move together with the sliding conveyor in the horizontal direction,
  - a cam provided on the movable rail,
  - a hinge included in the blade and configured to be rotated by movement of the cam, and
  - a spring configured to provide an elastic force to move the sliding conveyor to an initial position, and
- wherein the conveyor structure is configured to, based on the sliding conveyor moving to a maximum spacing distance in the horizontal direction, cause the blade to operate in conjunction with the sliding conveyor and move downward.

11. The garment folding apparatus of claim 10, wherein one surface of the cam is in contact with the hinge and is inclined to thereby cause the blade to be rotated by the movable rail that moves in the horizontal direction.

* * * * *